US008817545B2

(12) United States Patent
Seol et al.

(10) Patent No.: US 8,817,545 B2
(45) Date of Patent: Aug. 26, 2014

(54) SEMICONDUCTOR MEMORY DEVICES, SYSTEMS INCLUDING NON-VOLATILE MEMORY READ THRESHOLD VOLTAGE DETERMINATION

(75) Inventors: Chang-kyu Seol, Hwaseong-si (KR); Jun-jin Kong, Yongin-si (KR); Hong-rak Son, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 356 days.

(21) Appl. No.: 13/404,625

(22) Filed: Feb. 24, 2012

(65) Prior Publication Data

US 2012/0221772 A1    Aug. 30, 2012

(30) Foreign Application Priority Data

Feb. 24, 2011   (KR) .......................... 10-2011-0016643

(51) Int. Cl.
*G11C 11/34*    (2006.01)
(52) U.S. Cl.
USPC ............. 365/185.24; 365/185.03; 365/189.15
(58) Field of Classification Search
USPC ............................ 365/185.24, 185.03, 189.1
See application file for complete search history.

(56) References Cited

U.S. PATENT DOCUMENTS

| 2008/0263266 | A1 | 10/2008 | Sharon et al. |
| 2008/0313387 | A1 | 12/2008 | Shibata |
| 2009/0282186 | A1 | 11/2009 | Mokhlesi et al. |
| 2010/0118608 | A1* | 5/2010 | Song et al. ............... 365/185.11 |
| 2011/0246136 | A1* | 10/2011 | Haratsch et al. ............ 702/181 |

FOREIGN PATENT DOCUMENTS

| KR | 1020080012199 A | 2/2008 |
| KR | 1020100052159 A | 5/2010 |

* cited by examiner

*Primary Examiner* — Vu Le
*Assistant Examiner* — Han Yang
(74) *Attorney, Agent, or Firm* — Myers Bigel Sibley & Sajovec, P.A.

(57) ABSTRACT

A semiconductor memory system can include a memory device having a memory cell array that includes a plurality of memory cells. A memory controller can be configured to perform domain transformation on data written to and/or read from the plurality of memory cells to provide domain-transformed data and configured to perform signal processing on the domain-transformed data to output processed data or a control signal.

20 Claims, 18 Drawing Sheets

SEMICONDUCTOR MEMORY DEVICES, SYSTEMS INCLUDING NON-VOLATILE MEMORY READ THRESHOLD VOLTAGE DETERMINATION

CROSS-REFERENCE TO RELATED PATENT APPLICATION

This application claims the benefit of Korean Patent Application No. 10-2011-0016643, filed on Feb. 24, 2011, in the Korean Intellectual Property Office, the disclosure of which is incorporated herein in its entirety by reference.

FIELD

Embodiments of the inventive concept relate to semiconductor devices, and more particularly, to a semiconductor memory device and a semiconductor memory system.

BACKGROUND

Semiconductor memory devices can be classified into volatile memory devices and non-volatile memory devices. Signal processing with respect to data can improve the reliability of semiconductor memory devices by accurately storing the data in or reading the data from the semiconductor memory devices.

SUMMARY

In some embodiments according to inventive concept, a semiconductor memory system can include a memory device having a memory cell array that includes a plurality of memory cells. A memory controller can be configured to perform domain transformation on data written to and/or read from the plurality of memory cells to provide domain-transformed data and configured to perform signal processing on the domain-transformed data to output processed data or a control signal.

In some embodiments according to inventive concept, the memory controller is configured to transform the data from a time domain to a frequency domain to provide the domain-transformed data. In some embodiments according to inventive concept, the memory controller cam include a pre-processing unit that is configured to pre-process the data to provide the processed data in a format suitable for the signal processing. A domain transformation unit can be configured to transform the pre-processed data from a first domain to a second domain to provide transformed data and a post-processing unit can be configured to post-process the transformed data of the second domain to output the processed data or the control signal.

In some embodiments according to inventive concept, the memory controller can include a read voltage control unit that is configured to perform domain transformation on the data read from the plurality of memory cells and configured to estimate a distribution variation for the plurality of memory cells based on the domain transformed data to provide an estimated distribution variation, thereby controlling a voltage level of a read voltage for reading the data.

In some embodiments according to inventive concept, the read voltage control unit can include a distribution measurement unit that is configured to measure a distribution for the data to provide a measured distribution. A domain transformation unit can be configured to perform domain transformation on the measured distribution to provide a domain-transformed measured distribution and a distribution variation estimation unit can be configured to estimate the distribution variation based on the domain-transformed measured distribution, wherein the distribution variation represents a variation of the measured distribution in relation to a reference distribution.

In some embodiments according to inventive concept, the read voltage control unit further includes a voltage level adjustment unit that is configured to adjust the voltage level of the read voltage based on the estimated distribution variation and a reference read voltage.

In some embodiments according to inventive concept, the distribution measurement unit can include a data read unit that is configured to set a plurality of read levels for measuring the distribution for the plurality of memory cells and configured to perform a read operation on the plurality of memory cells at each of the plurality of read level. A histogram generation unit can be configured to determine the number of pieces of data '1' or '0' from among pieces of data read at each of the plurality of read levels and configured to generate a histogram showing the number of pieces of data '1' or '0' based on the result of the calculation.

In some embodiments according to inventive concept, a method of operating a non-volatile memory can include reading data from a plurality of memory cells in a non-volatile memory. Time domain data corresponding to the data read from the memory can be transformed to frequency domain data to provide domain-transformed data. A distribution variation can be estimated for the plurality of memory cells according to the domain-transformed data to provide an estimated distribution variation.

In some embodiments according to inventive concept, reading the data can be provided by adjusting a level of a read voltage used to read the data from the plurality of memory cell based on the estimated distribution variation. In some embodiments according to inventive concept, reading the data can include adjusting the level of the read voltage to provide an optimal read voltage level used to read the plurality of memory cells to reduce read data errors without error correction circuitry.

In some embodiments according to inventive concept, the non-volatile memory can be a multi-level cell flash memory. In some embodiments according to inventive concept, the method can further include setting a threshold read voltage window to specify a sub-set of the level of the read voltage to be used for estimating the distribution variation.

In some embodiments according to inventive concept, the threshold read voltage window can be less than a full range of read voltages used to determine all states of each of the plurality of memory cells. In some embodiments according to inventive concept, intervals between different read voltages in the window are relatively large.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS ACCORDING TO THE INVENTIVE CONCEPT

Figure 1:
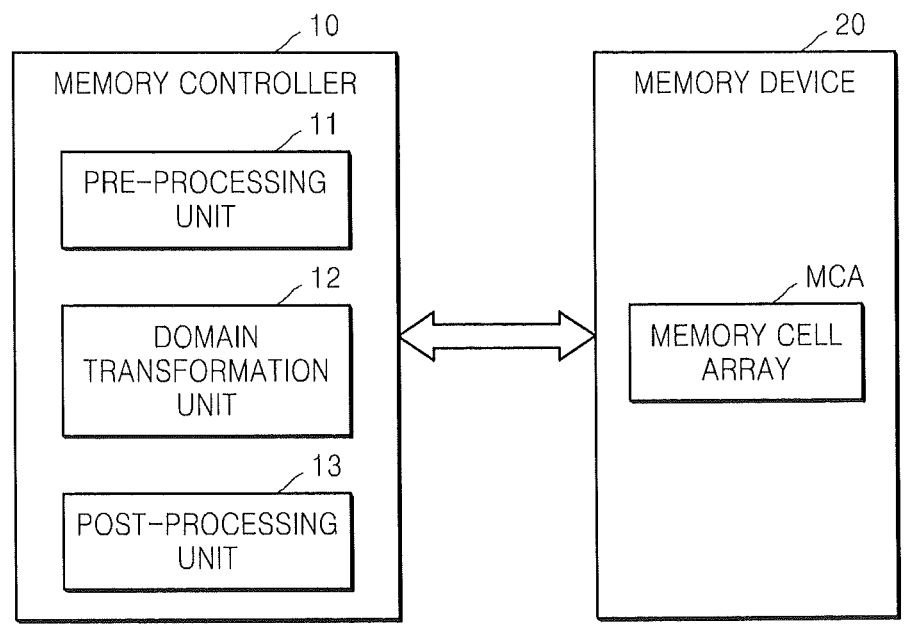
FIG. 1 is a block diagram of a semiconductor memory system according to an embodiment of the inventive concept.

The inventive concept will now be described more fully with reference to the accompanying drawings, in which exemplary embodiments of the inventive concept are shown.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As described herein, in some embodiments according to the inventive concept, data written to and/or read from a plurality of memory cells included in a memory device can be transformed from one domain to another, whereupon signal processing can be carried out on the domain-transformed data. As appreciated by the present inventive entity, the complexity of calculations performed in the transformed domain may be reduced relative to if the same calculation were to be carried out in the original domain.

Moreover, by performing the domain transformation on a plurality of pieces of data stored in the memory cells, by estimating a distribution variation for the memory cells according to the domain-transformed data pieces, the complexity of an estimation operation may be reduced and the raw bit error rate (RBER) of the device may be improved, thereby improving the accuracy of the estimation.

Further, by adjusting the level of a read voltage according to the estimated distribution variation, the data may be more accurately read from the memory cells even when a distribution for the memory cells varies, whereby the reliability of the semiconductor memory device may be improved. Moreover, an optimal voltage level of the read voltage may be determined without the requirement of performing error correction coding/decoding at several read levels, which may be used to correct an error of a read operation in the semiconductor memory device.

In addition, in some embodiments according to the inventive concept, by setting a plurality of read levels within a predetermined threshold voltage window, which is a part of the entire threshold voltage region, and estimating the distribution variation for the memory cells according to data read at the set read levels, the number of read operations performed may be reduced.

In some embodiments according to the inventive concept, the intervals between the read levels for measuring a distribution can be made relatively large, so that the resolution between the read levels is relatively low. Thus the number of operations performed for distribution measurement may be reduced. Furthermore, even when the resolution between the read levels is relatively low, the reliability of distribution variation estimation may be improved by estimating the distribution variation for the memory cells according to domain-transformed data.

In some embodiments according to the inventive concept, by adjusting the size of a domain transformation unit that performs domain transformation on the plurality of pieces of data, estimation accuracy may be adaptively changed according to the desired reliability of a semiconductor memory device.

FIG. 1 is a block diagram of a semiconductor memory system according to an embodiment of the inventive concept.

Referring to FIG. 1, the semiconductor memory system 1 may include a memory controller 10 and a memory device 20. The memory controller 10 may control the memory device 20, and in detail, may control a program (or write) operation, a read operation, and an erase operation with respect to the memory device 20 by providing an address and a command to the memory device 20.

The memory device 20 may include a memory cell array MCA which may include a plurality of memory cells arranged in regions where a plurality of word lines intersect with a plurality of bit lines. In an embodiment, the plurality of memory cells may be flash memory cells, and the memory cell array MCA may be a NAND flash memory cell array or a NOR flash memory cell array. Embodiments of the inventive concept are described in detail by illustrating a case where the plurality of memory cells are flash memory cells. However, the inventive concept is not limited to the illustrated example. In other embodiments according to the inventive concept, the plurality of memory cells may be resistive memory cells such as resistive RAMs (RRAMs), phase change RAMs (PRAMs), or magnetic RAMs (MRAMs).

The memory controller 10 may include a pre-processing unit 11, a domain transformation unit 12, and a post-processing unit 13, and may control the memory device 20 by performing domain transformation with respect to data written to, or read out from, the plurality of memory cells, and performing signal processing with respect to domain-transformed data to output processed data or a control signal.

The pre-processing unit 11 may perform pre-processing on the data written to, or read out from, the plurality of memory cells so that the data has a format suitable for signal processing.

The domain transformation unit 12 may transform pre-processed data from a first domain to a second domain. For example, the first domain may be a time domain, and the second domain may be a frequency domain. As such, when the domain of data is transformed into a frequency domain and signal processing is performed in the frequency domain, the complexity of a calculation may be reduced and thus signal processing may be more efficiently performed than when signal processing is performed in the time domain.

In detail, the domain transformation unit 12 may perform, on the pre-processed data, at least one selected from the group consisting of Abel transform, Bateman transform, Fourier transform, short-time Fourier transform (STFT), Hankel transform, Hartley transform, Hilbert transform, Hilbert-Schmidt integral operator, Laplace transform, Two-sided Laplace transform, Laplace-Stieltjes transform (LST), linear canonical transform (LCT), Mellin transform, Poisson-Mellin-Newton cycle, Radon transform, Stieltjes transform, Sumudu transform, Laplace-Carson transform, wavelet transform, Binomial transform, discrete Fourier transform, fast Fourier transform, discrete cosine transform, modified discrete cosine transform, discrete Hartley transform, discrete sine transform, discrete wavelet transform, fast wavelet transform, irrational base discrete weighted transform (IB-DWT), Number-theoretic transform, Stirling transform, Z-transform, Karhunen-Loève transform, Bäcklund transform, bilinear transform, Box-Muller transform, Burrows-Wheeler transform, Chirplet transform, distance transform, Fractal transform, Hadamard transform, Hough transform, Legendre transform, Möbius transform, perspective transform, Y-delta transform, Hayesian transform, and/or the inverse of each of the aforementioned transforms. Other transforms (or inverse transforms) may also be used.

The post-processing unit 13 may perform post-processing on data of the second domain to output the processed data or the control signal. In detail, the post-processing unit 13 may perform, on the data of the second domain, at least one selected from the group consisting of maximum likelihood estimation/detection, Bayesian estimation/detection, moment estimation, minimum mean squared error (MMSE), maximum a posteriori (MAP) estimation/detection, minimum variance unbiased estimator (MVUE), best linear unbiased estimator (BLUE), least square estimation, unbiased estimators, particle filter, Markov chain Monte Carlo (MCMC), Kalman filter, Ensemble Kalman filter (EnKF), and Wiener filter.

Figure 2:
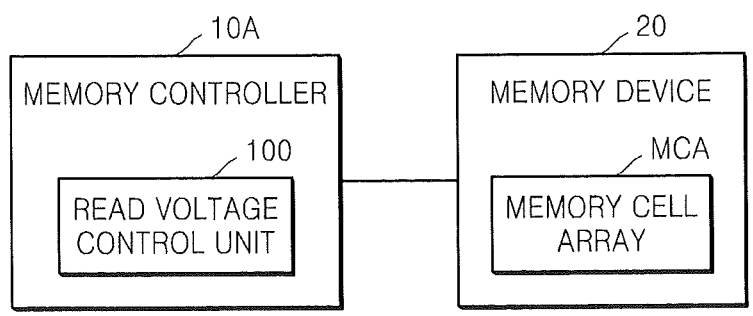
FIG. 2 is a block diagram of a semiconductor memory system, which is an example of the semiconductor memory system of FIG. 1.

FIG. 2 is a block diagram of a semiconductor memory system, which is an example of the semiconductor memory system of FIG. 1.

Referring to FIG. 2, the semiconductor memory system 1A may include a memory controller 10A and the memory device 20. In the present embodiment, the memory controller 10A may include a read voltage control unit 100, and the read voltage control unit 100 may correspond to a structure including the pre-processing unit 11, the domain transformation unit 12, and the post-processing unit 13 of FIG. 1. A concrete correspondence between the read voltage control unit 100 and the structure including the pre-processing unit 11, the domain transformation unit 12, and the post-processing unit 13 are also described with reference to FIG. 9.

The read voltage control unit 100 may control the voltage level of a read voltage for reading the data stored in the memory cells included in the memory cell array MCA. As such, even when a threshold voltage of the memory cells is changed by, for example, external stimulus (for example, as a result of the Yupin effect) and/or wear, the memory controller 10A may control the voltage level of the read voltage according to the changed threshold voltage by including the read voltage control unit 100, thereby improving a raw bit error rate (RBER).

Figure 3:
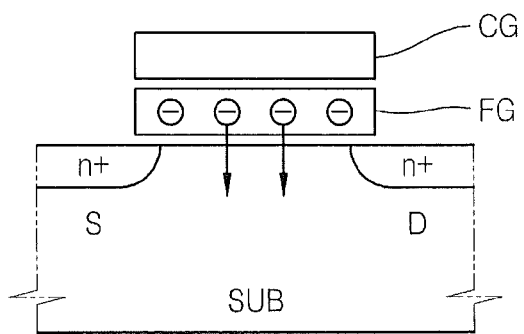
FIG. 3 is a cross-sectional view of a memory cell included in the memory cell array of FIG. 2.

FIG. 3 is a cross-sectional view of a memory cell included in the memory cell array of FIG. 2.

Referring to FIG. 3, a source S and a drain D may be formed on a substrate SUB, and a channel may be formed between the source S and the drain D. A floating gate FG is formed above the channel, and an insulation layer such as a tunneling insulation layer may be disposed between the channel and the floating gate FG. A control gate CG is formed above the floating gate FG, and an insulation layer such as a blocking insulation layer may be disposed between the floating gate FG and the control gate CG. Voltages necessary for a program operation, an erase operation, and a read operation with respect to a memory cell may be applied to the substrate SUB, the source S, the drain D, and the control gate CU.

As for flash memory devices, data may be read from a memory cell according to a threshold voltage Vth of the memory cell. The threshold voltage of the memory cell may be determined according to the number of electrons stored in the floating gate FG. In general, the more the electrons stored in the floating gate FG, the greater the threshold voltage of the memory cell.

Referring to FIG. 3, the electrons stored in the floating gate FG of the memory cell may leak in a direction indicated by arrows due to various reasons, and thus the threshold voltage of the memory cell may change. In an example, the electrons stored in the floating gate FG may leak due to wear of the memory cell. In detail, when an access operation with respect to the memory cell, such as a program operation, an erase operation, or a read operation, is repeated, the insulation layer between the channel and the floating gate FG may be worn, and thus electrons may leak from the floating gate FG. In another example, the electrons stored in the floating gate FG may leak due to a high-temperature stress, a difference between temperatures during programming and reading, or the like.

Figure 4:
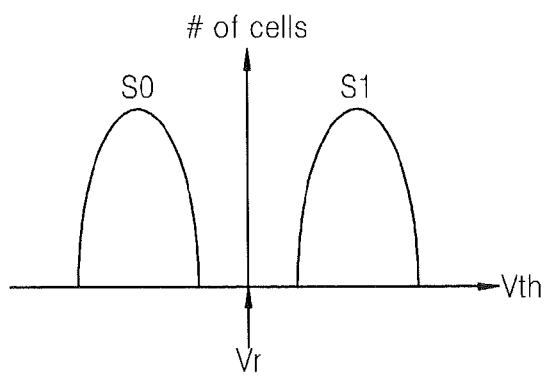
FIG. 4 is a graph showing a threshold voltage distribution of the memory cell of FIG. 3 when the memory cell is a single level cell (SLC)

FIG. 4 is a graph showing a threshold voltage distribution of the memory cell of FIG. 3 when the memory cell is a single level cell (SLC).

Referring to FIG. 4, the horizontal axis indicates the threshold voltage Vth of the memory cell, and the vertical axis indicates the number of memory cells. When a memory cell is an SLC, the memory cell may have a state S0 or a state S1.

When a read voltage Vr is applied to the control gate CG of the memory cell, the memory cell in the state 'S0' is turned on, while the memory cell in the state 'S1' is turned off. When the memory cell is turned on, a current flows through the memory cell. When the memory cell is turned off, no current flows through the memory cell. Accordingly, the data stored in the memory cell may be identified according to whether the memory cell is turned on or off. For example, the memory cell in the state 'S0' may store data '1', and the memory cell in the state 'S1' may store data '0'.

Figure 5:
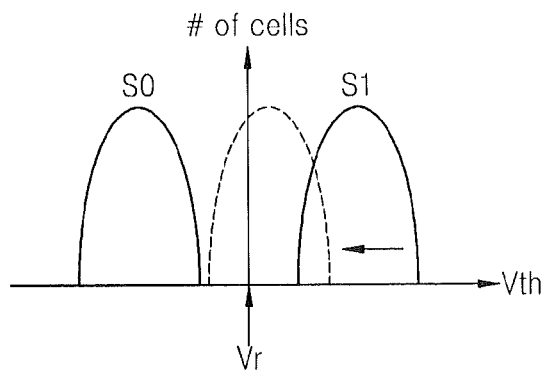
FIG. 5 is a graph showing a case where a threshold voltage of the memory cell illustrated in FIG. 4 decreases.

FIG. 5 is a graph showing a case where the threshold voltage Vth of the memory cell illustrated in FIG. 4 has decreased.

Referring to FIG. 5, a solid line indicates an initial threshold voltage of the memory cell, and a dotted line indicates a decreased threshold voltage obtained due to, for example, external stimulus and/or wear. In spite that the memory cells belonging to a hatched region of FIG. 5 have been programmed in the state 'S1', the memory cells may be determined to be in the state 'S0' because of the reduction of the threshold voltage. Accordingly, an error may occur during a read operation, and thus the reliability of a semiconductor memory device may be reduced.

Figure 6:
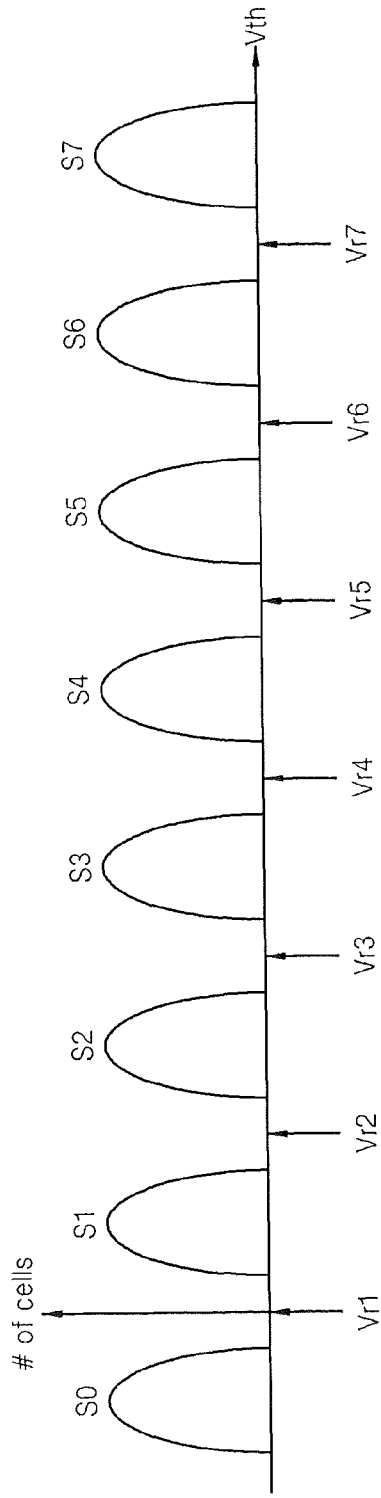
FIG. 6 is a graph showing a threshold voltage distribution of the memory cell of FIG. 3 when the memory cell is a multi-level cell (MLC)

FIG. 6 is a graph showing a threshold voltage distribution of the memory cell of FIG. 3 when the memory cell is a multi-level cell (MLC).

Referring to FIG. 6, the horizontal axis indicates the threshold voltage Vth, and the vertical axis indicates the number of memory cells, which together illustrate the distribution of the memory cells that hold data corresponding to a particular state (i.e., 1 or 0). When the memory cell is an MLC, for example, a 3-bit MLC, the memory cell may have one of 8 states S0 through S7. The state 'S0' represents an erase state, and the states 'S1' through 'S7' represents program states. In the case of an MLC as compared to an SLC, an interval between threshold voltage distributions is small. Thus, in the MLC, even a small change in a threshold voltage may cause an error.

Figure 7:
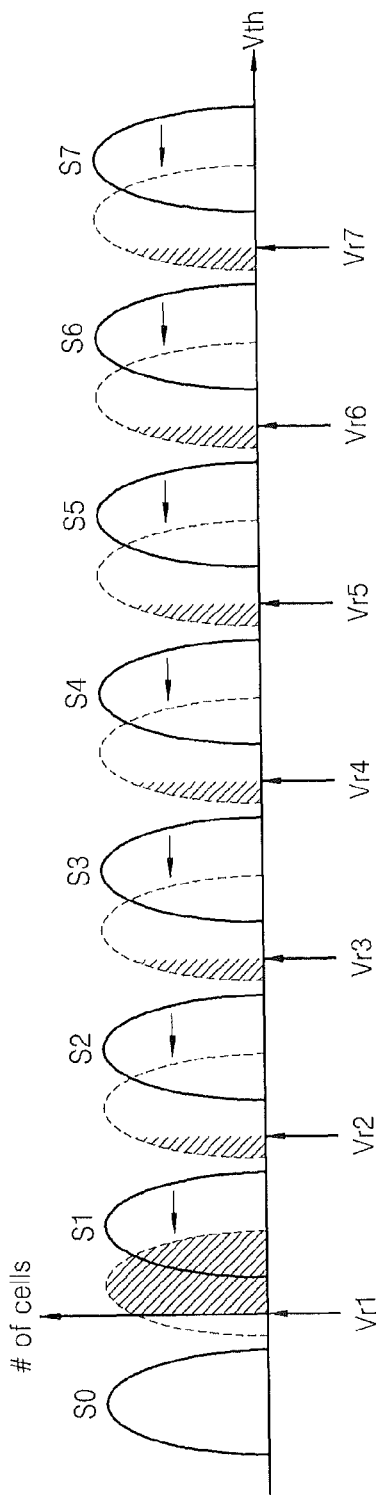
FIG. 7 is a graph showing a case where the threshold voltage of the memory cell illustrated in FIG. 6 has decreased.

FIG. 7 is a graph showing a case where the threshold voltage of the memory cell illustrated in FIG. 6 has decreased.

Referring to FIG. 7, a solid line indicates an initial threshold voltage of the memory cell, and a dotted line indicates a decreased threshold voltage obtained due to, for example, external stimulus and/or wear. Similar to the graph of FIG. 5, in the present graph, a read error may occur in the memory cells corresponding to a hatched portion due to the reduction in the threshold voltage. Thus, the reliability of the semiconductor memory device may decrease.

When data is read from a flash memory device, the RBER differs according to the voltage level of a read voltage, and an optimal voltage level of the read voltage may depend on the shape of a distribution of memory cells. Accordingly, as the distribution of memory cells varies, the optimal voltage level of the read voltage used to read data from the flash memory device may change.

Therefore, the optimal voltage level of the read voltage needs to be determined by estimating the variation of the distribution and changing the voltage level of the read voltage according to the estimated distribution variation. In this case, to efficiently determine the optimal voltage level of the read voltage, accurate estimation of the distribution variation based on a small amount of measured data may be used.

Referring back to FIG. 2, the read voltage control unit 100 may perform domain transformation on the data obtained from the memory cell array MCA, estimate a distribution variation based on the domain-transformed data, and control the voltage level of the read voltage according to the estimated distribution variation. The read voltage control unit 100 may generate data of the second domain by performing domain transformation on the data of the first domain, and estimate the distribution variation according to the data of the second domain. For example, the first domain may be a time domain, and the second domain may be a frequency domain. Alternatively, the first domain may be a frequency domain, and the second domain may be a time domain.

Figure 8:
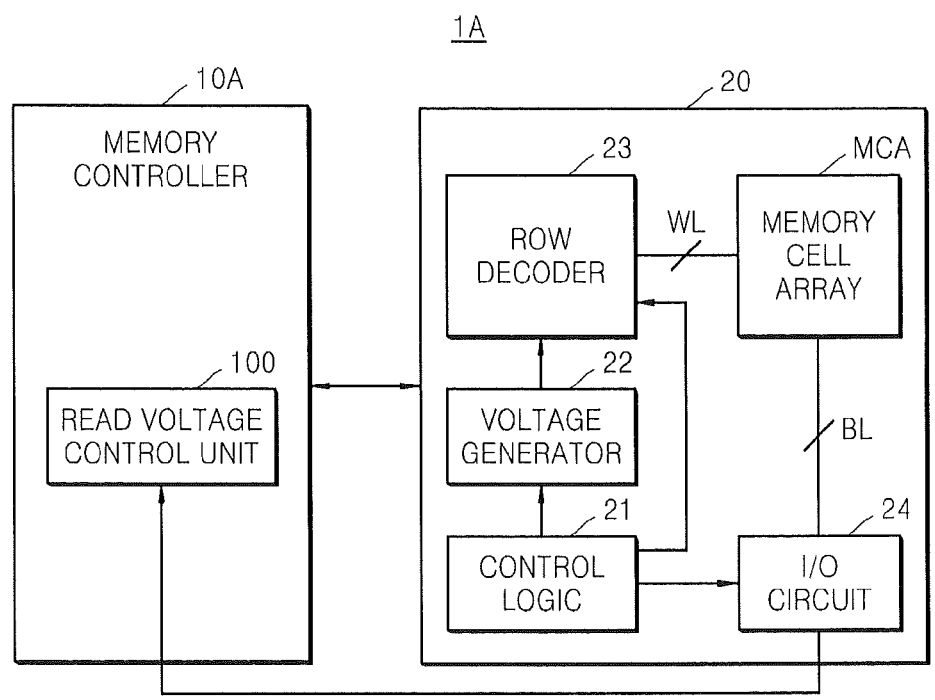
FIG. 8 is a block diagram illustrating the semiconductor memory system of FIG. 2 in greater detail.

FIG. 8 is a block diagram illustrating the semiconductor memory system of FIG. 2 in greater detail.

Referring to FIG. 8, the semiconductor memory system 1A may include the memory controller 10A and the memory device 20. The memory controller 10A may include the read voltage control unit 100, and the memory device 20 may include the memory cell array MCA, a control logic 21, a voltage generator 22, a row decoder 23, and an input/output (I/O) circuit 24.

The control logic 21 may output a control signal for use in writing data to or reading data from the memory cell array MCA according to a command received from the memory controller 10A. The control signal output from the control logic 21 may be transmitted to the voltage generator 22, the row decoder 23, and the I/O circuit 24.

The voltage generator 22 may generate a driving voltage for driving a plurality of word lines WL, based on the control signal received from the control logic 21. In detail, the driving voltage may be a write voltage (or a program voltage), a read voltage, an erase voltage, or a pass voltage.

The row decoder 23 may activate some of the word lines WL, based on a row address. In detail, during a read operation, the row decoder 23 may apply a read voltage to a word line selected from the word lines WL and apply a pass voltage to the remaining unselected word lines. During a write operation, the row decoder 23 may apply a write voltage to a selected word line and apply the pass voltage to the unselected word lines.

The I/O circuit 24 may be connected to the memory cell array MCA via a plurality of bit lines BL. In detail, during a read operation, the I/O circuit 24 may operate as a sense amplifier so as to output data stored in the memory cell array MCA. During a write operation, the I/O circuit 24 may operate as a write driver so as to input data desired to be stored in the memory cell array MCA.

The read voltage control unit 100 may perform domain transformation on the data received from the I/O circuit 24, estimate a distribution variation based on the domain-transformed data, and generate a command for changing the voltage level of the read voltage according to the estimated distribution variation. According to an embodiment, the read voltage control unit 100 may change the voltage level of only some of a plurality of read voltages. At this time, the generated command may be provided to the control logic 21, the control logic 21 may output a control signal based on the received command, and the voltage generator 22 may generate a read voltage whose voltage level has changed, based on the control signal. In some embodiments according to the inventive concept, the data written to the memory cells on which the processing is performed, is predetermined so that the integrity of the data may be more easily determined when read using the different read levels.

According to the present embodiment, the read voltage control unit 100 performs domain transformation on a plurality of pieces of data output from the I/O circuit 24. For example, the read voltage control unit 100 may transform data of the time domain into data of the frequency domain. As such, the read voltage control unit 100 may greatly reduce the complexity of a calculation by estimating a distribution variation with respect to the pieces of data according to the data in the frequency domain.

Figure 9:
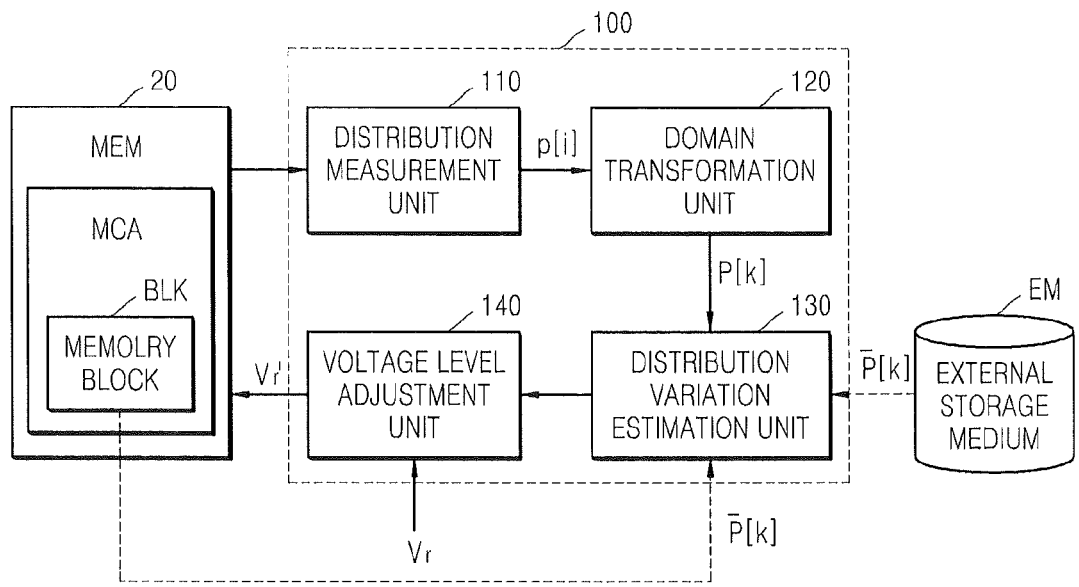
FIG. 9 is a block diagram of the read voltage control unit illustrated in FIG. 8.

FIG. 9 is a block diagram of the read voltage control unit illustrated in FIG. 8.

Referring to FIGS. 8 and 9, the read voltage control unit 100 may include a distribution measurement unit 110, a domain transformation unit 120, a distribution variation estimation unit 130, and a voltage level adjustment unit 140. The distribution measurement unit 110 may correspond to the pre-processing unit 11 of FIG. 1, the domain transformation unit 120 may correspond to the domain transformation unit 12 of FIG. 1, and the distribution variation estimation unit 130 and the voltage level adjustment unit 140 may correspond to the post-processing unit 13 of FIG. 1.

The distribution measurement unit 110 may measure a distribution for the pieces of data output from the I/O circuit 24 and generate a measured distribution p[i]. The measured distribution p[i] output by the distribution measurement unit 110 may be data in the first domain. For example, the first domain may be the time domain.

The domain transformation unit 120 may perform domain transformation on the measured distribution p[i] generated by the distribution measurement unit 110, to generate a domain-transformed measured distribution P[k]. In detail, the domain transformation unit 120 may perform the above-described various domain transformations on the measured distribution p[i] to generate the domain-transformed measured distribution P[k]. The domain-transformed measured distribution P[k] generated by the domain transformation unit 120 may be data in the second domain. For example, the second domain may be the frequency domain. According to an embodiment, the domain transformation unit 120 may perform an inverse fast Fourier transform (IFFT) on the measured distribution p[i] to generate the domain-transformed measured distribution P[k] (that is, $P[k]=IFFT\{p[i]\}$).

The distribution variation estimation unit 130 may estimate the distribution variation based on the domain-transformed measured distribution P[k] generated by the domain transformation unit 120. The distribution variation represents a variation of a measured distribution in relation to a reference distribution, and the reference distribution may be a distribution measured before a change in the threshold voltage of memory cells. The domain transformation may be performed even on the reference distribution, and a domain-transformed reference distribution $\overline{P}[k]$, which is a result of the domain transformation, may be stored in an arbitrary region. According to an embodiment, the domain-transformed reference distribution $\overline{P}[k]$ may be stored in a part of the memory cell array MCA, for example, in a memory block BLK. According to another embodiment, the domain-transformed reference distribution $\overline{P}[k]$ may be stored in an external storage medium EM.

The voltage level adjustment unit 140 may adjust the voltage level of the read voltage according to the distribution variation estimated by the distribution variation estimation unit 130 and a reference read voltage Vr. Although the voltage level adjustment unit 140 is included in the memory controller 10A to serve as a component of the read voltage control unit 100 in the present embodiment, the inventive concept is not limited thereto. In another embodiment, the voltage level adjustment unit 140 may be included in the memory device 20 to serve as a component of the control logic 21. In another embodiment, the voltage level adjustment unit 140 may be included in the memory device 20 to serve as a separate component.

Figure 10:
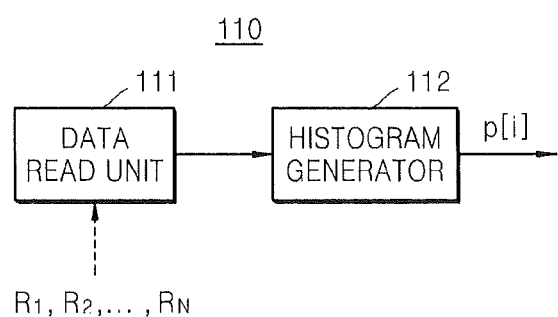
FIG. 10 is a block diagram of a distribution measurement unit of FIG. 9.

FIG. 10 is a block diagram of the distribution measurement unit of FIG. 9.

Referring to FIG. 10, the distribution measurement unit 110 may include a data read unit 111 and a histogram generator 112.

The data read unit 111 may set a plurality of read levels $R_1$, $R_2$, ..., and $R_N$ for measuring a distribution for the memory cells included in the memory cell array MCA, and may perform a read operation on the memory cells at each of the read levels $R_1$, $R_2$, ..., and $R_N$. Alternatively, the data read unit 111 may receive the read levels $R_1$, $R_2$, ..., and $R_N$ from an external source. In this case, a read operation on the memory cells may be performed at each of the received read levels $R_1$, $R_2$, ..., and $R_N$.

In detail, when the data read unit 111 performs a read operation on the memory cells at a first read level $R_1$, the data stored in a memory cell having a threshold voltage less than the first read level $R_1$ from among the memory cells may be determined to be '1', and the data stored in a memory cell having a threshold voltage greater than the first read level $R_1$ from among the memory cells, may be determined to be '0'.

Figure 11:
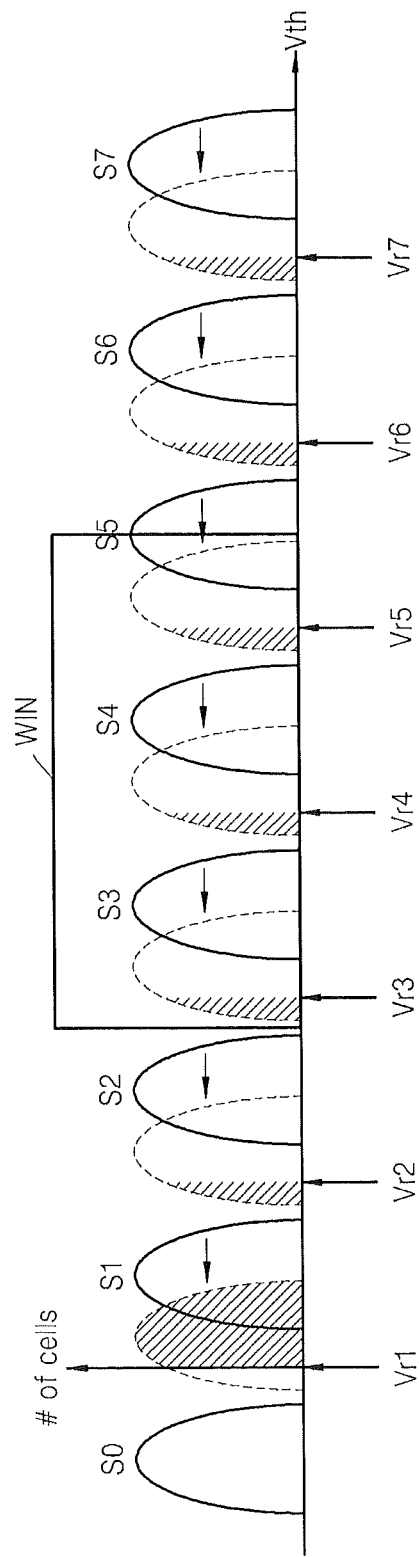
FIG. 11 is a graph showing changed and unchanged threshold voltage distributions for a memory cells to explain an operation of the data read unit of FIG. 10.

FIG. 11 is a graph showing changed and unchanged threshold voltage distributions for a memory cells to explain an operation of the data read unit of FIG. 10.

Referring to FIGS. 10 and 11, the horizontal axis indicates the threshold voltage Vth, and the vertical axis indicates the number of memory cells. A solid line indicates an initial threshold voltage of the memory cell, and a dotted line indicates a decreased threshold voltage obtained due to, for example, external stimulus and/or wear. A region marked by a thick solid line represents a threshold voltage window WIN.

The data read unit 111 may set the read levels $R_1, R_2, \ldots,$ and $R_N$ within a part of the entire threshold voltage region, that is, within the threshold voltage window WIN. The distribution of the memory cells may be changed in a direction from the solid line to the dotted line due to, for example, external stimulus and/or wear. In this case, distributions at the states S1 through S7 may be changed at similar rates and/or amounts. Therefore, by acquiring variations of the distributions of some (for example, states S3 through S5) of the states S1 through S7 without acquiring all of the distributions at the states S1 through S7, variations of the distributions at the remaining states may also be estimated. According to the present embodiment, in a read operation for distribution estimation, the number of times of read operations may be reduced by setting the read levels $R_1, R_2, \ldots,$ and $R_N$ within the threshold voltage window WIN. Thus, the complexity of arithmetic operations may be reduced, and the efficiency of the distribution estimation may be improved.

According to some embodiments of the inventive concept, intervals $\Delta$ between the different read levels $R_1, R_2, \ldots,$ and $R_N$ may be the same. In some embodiments according to the inventive concept, the intervals $\Delta$ between the different read levels $R_1, R_2, \ldots,$ and $R_N$ may be different from each other. In detail, the performance of the distribution measurement unit 110 may be improved by decreasing the intervals between the read levels in a region between distributions for two adjacent states (for example, a region between the states S3 and S4).

Referring back to FIG. 10, the histogram generator 112 may calculate the number of pieces of data '1' or '0' from among the pieces of data read at each of the read levels $R_1, R_2, \ldots,$ and $R_N$, and generate a histogram based on the result of the calculation. The generated histogram may be used as a measured distribution that depends on a change of the threshold voltage of the memory cells.

A case where the histogram generator 112 calculates the number of pieces of data '1' to generate a histogram will now be described in detail. At this time, the histogram generator 112 may generate a histogram according to Equation 1 below:

$$p[i]=c[i+1]-c[i] \quad \text{[Equation 1]}$$

where p[i] indicates a histogram at an i-th read level, c[i] indicates the number of pieces of data '1' from among pieces of data read out at the i-th read level, c[i+1] indicates the number of pieces of data '1' from among pieces of data read out at an (i+1)th read level, i denotes an integer less than or equal to N−1, and N denotes the number of read levels.

In detail, the histogram generator 112 may acquire a histogram p[1] based on a difference between a number c[1] of pieces of data '1' from among pieces of data read out at the first read level $R_1$ and a number c[2] of pieces of data '1' from among pieces of data read out at a second read level $R_2$, and acquire a histogram p[2] based on a difference between the number c[2] of pieces of data '1' from among the pieces of data read out at the second read level $R_2$ and a number c[3] of pieces of data '1' from among pieces of data read out at a third read level $R_3$.

Figure 12:
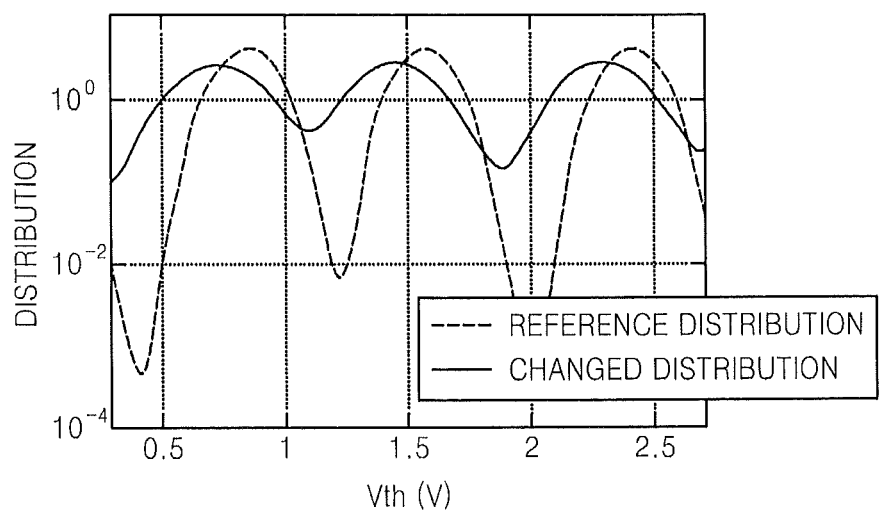
FIG. 12 is an exemplary graph showing a reference distribution and a changed distribution for the plurality of memory cells.

FIG. 12 is an exemplary graph showing a reference distribution and a changed distribution for the plurality of memory cells.

Referring to FIG. 12, the horizontal axis indicates a threshold voltage in the unit of V, and the vertical axis indicates a distribution in the unit of log scale. The distribution may correspond to a probability density function (pdf), a dotted line indicates the reference distribution, and a solid line indicates the changed distribution. In the present example, a mean variation $\Delta m$ between the reference distribution and the changed distribution is 0.12 V, and a variance variation $\Delta\sigma^2$ between the reference distribution and the changed distribution is 0.015. A case where the distribution of the memory cells is changed according to the mean variation $\Delta m$ (that is, 0.12 V) and the variance variation $\Delta\sigma^2$ (that is, 0.015) will now be described with reference to embodiments of the inventive concept and results of application of the embodiments.

Figure 13:
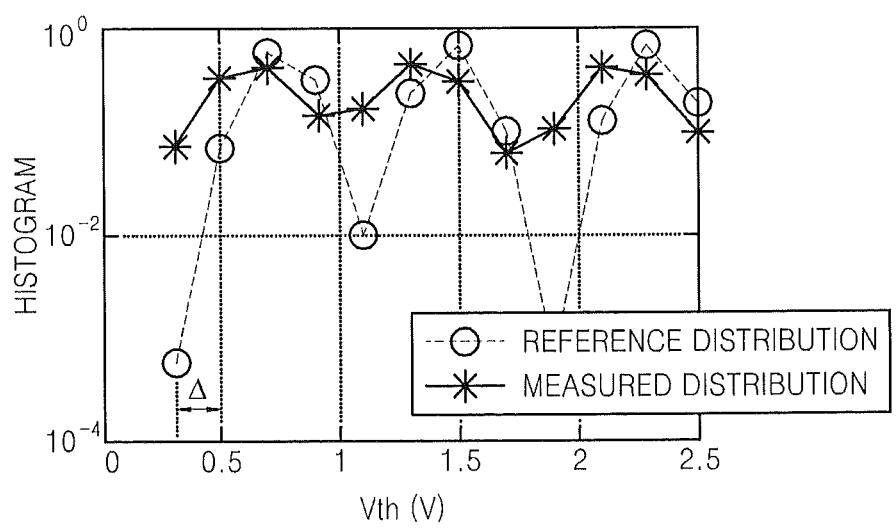
FIG. 13 is a graph showing an example of the histogram generated by the distribution measurement unit illustrated in FIG. 10.

FIG. 13 is a graph showing an example of the histogram generated by the distribution measurement unit illustrated in FIG. 10.

Referring to FIG. 13, the horizontal axis indicates a threshold voltage in the unit of V, and the vertical axis indicates a distribution in the unit of log scale. The intervals $\Delta$ between the read levels $R_1, R_2, \ldots,$ and $R_N$ are 0.2V, and the threshold voltage window WIN ranges from 0.3V to 2.7V. Here, a distribution may correspond to the histogram acquired using Equation 1, a dotted line indicates a reference distribution, and a solid line indicates a measured distribution.

According to a conventional art, a plurality of read levels are set in the entire threshold voltage region to measure a distribution at each of the read levels. However, in some embodiments according to the inventive concept, the distribution measurement unit 110 may set the read levels $R_1, R_2, \ldots,$ and $R_N$ in the threshold voltage window which is a part of the entire threshold voltage region, and generate a histogram at each of the set read levels $R_1, R_2, \ldots,$ and $R_N$, by using Equation 1. The generated histogram may be used as the measured distribution. In some embodiments according to the inventive concept, the number of set read levels $R_1, R_2, \ldots,$ and $R_N$ may be reduced compared to the conventional art, and thus the number of operations performed may be reduced.

According to the conventional art, an interval (that is, a target resolution) between a plurality of read levels are set to be about 20 mV, which is narrow, and the distribution is measured at each of the read levels. However, according to the present embodiment, the intervals $\Delta$ between the read levels $R_1, R_2, \ldots,$ and $R_N$ are about 200 mV, and thus a resolution between the read levels is relatively low compared to the conventional art. Accordingly, according to the present embodiment, the number of operations performed for distribution measurement may be reduced by measuring a distribution by using the read levels $R_1, R_2, \ldots,$ and $R_N$ with a relatively low resolution. Even when the resolution between the read levels is relatively low, the reliability of distribution variation estimation may be improved by estimating a distribution variation for the memory cells according to domain-transformed data.

Figure 14:
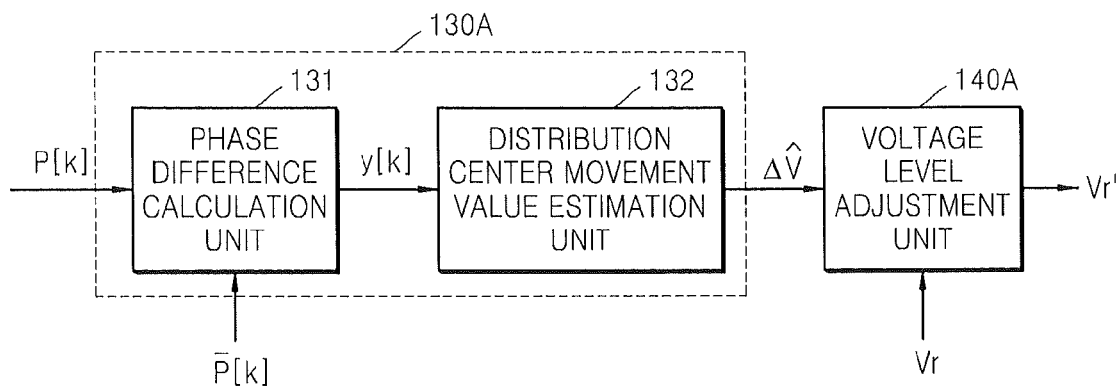
FIG. 14 is a block diagram of a distribution variation estimation unit and a voltage level adjustment unit, which are examples of the distribution variation estimation unit and the voltage level adjustment unit of FIG. 9.

FIG. 14 is a block diagram of a distribution variation estimation unit and a voltage level adjustment unit, which are examples of the distribution variation estimation unit and the voltage level adjustment unit of FIG. 9.

Referring to FIG. 14, the distribution variation estimation unit 130A may include a phase difference calculation unit 131 and a distribution center movement value estimation unit 132. Accordingly, when a distribution of a specific state of the memory cells moves in a specific direction, a distribution center movement value $\Delta\hat{V}$ may be estimated based on a phase difference between the domain-transformed reference distribution $\overline{P}[k]$ and the domain-transformed measured distribution P[k].

When the threshold voltage of a memory cell is changed due to, for example, external stimulus and/or wear, an initial threshold voltage is V, and a distribution center movement value is $\Delta V$, a changed threshold voltage V' may be obtained using Equation 2 below:

$$V' = V + \Delta V \qquad \text{[Equation 2]}$$

A distribution of a semiconductor memory device corresponds to a probability density function which is used in a probability theory, and a Fourier transform pair of the probability density function is a characteristic function. The characteristic function of a random variable V may be defined as in Equation 3 below:

$$\Phi_V(v) = E[\exp(jvV)] \qquad \text{[Equation 3]}$$

where E[ ] indicates an expectation operation, V indicates a not-transformed variable, that is, a variable in the first domain, and v indicates a transformed variable, that is, a variable in the second domain.

Using Equations 2 and 3, the characteristic function of a random variable V' corresponding to the changed threshold voltage may be defined as in Equation 4 below:

$$\Phi_{V'}(v) = E[\exp(jvV')] = E[\exp(jv(V+\Delta V))] = \exp(jv\Delta V)E[\exp(jvV)] = \exp(jv\Delta V)\Phi_V(v) \qquad \text{[Equation 4]}$$

Using Equation 4, the distribution center movement value $\Delta V$ may be calculated according to Equation 5 below:

$$v\Delta V = \angle \Phi_{V'}(v)\Phi_V^*(v) \qquad \text{[Equation 5]}$$

As such, a phase difference between characteristic functions (i.e., $\Phi_V(v)$ and $\Phi_{V'}(v)$) before and after distribution center movement may be represented as a linear equation with respect to v, and an inclination of the linear equation is proportional to the distribution center movement value $\Delta V$. Therefore, the phase difference between the characteristic functions (i.e., $\Phi_V(v)$ and $\Phi_{V'}(v)$) before and after the distribution center movement is calculated, and, when the inclination of a corresponding linear equation is estimated, the distribution center movement value $\Delta V$ of the threshold voltage may be estimated.

However, in some embodiments according to the inventive concept, an output of the domain transformation unit 12, that is, the domain-transformed measured distribution P[k], instead of the characteristic function may be used. An operation of the distribution variation estimation unit 13A, that is, an arithmetic operation using the domain-transformed measured distribution P[k], will now be described in detail.

The phase difference calculation unit 131 may receive the domain-transformed measured distribution P[k] and the domain-transformed reference distribution $\overline{P}[k]$ and calculate a phase difference between the domain-transformed measured distribution P[k] and the domain-transformed reference distribution $\overline{P}[k]$. At this time, the domain-transformed measured distribution P[k] may be received from the domain transformation unit 120 illustrated in FIG. 9. As illustrated in FIG. 9, the domain-transformed reference distribution $\overline{P}[k]$ may be received from a part of the memory cell array MCA, for example, from the memory block BLK or may be received from the external storage medium EM. However, according to another embodiment, the phase difference calculation unit 131 may receive a reference distribution whose domain has not yet been transformed.

In detail, the phase difference calculation unit 131 may calculate the phase difference by using Equation 6 below:

$$y[k] = \angle P[k](\overline{P}[k])^* \qquad \text{[Equation 6]}$$

where $\overline{P}[k]$ indicates the domain-transformed reference distribution (for example, a result of IFFT on a reference distribution), P[k] indicates the domain-transformed measured distribution (for example, a result of IFFT on a changed measured distribution), and y[k] indicates a phase difference between the domain-transformed measured distribution P[k] and the domain-transformed reference distribution $\overline{P}[k]$. P[k] and P[k] may be results of IFFT on distributions measured at equal interval. The phase difference calculation unit 131 may use a COordinate Rotation DIgital Computer (CORDIC) algorithm, whereby efficient hardware implementation of the phase difference calculation unit 131 is possible.

Figure 15:
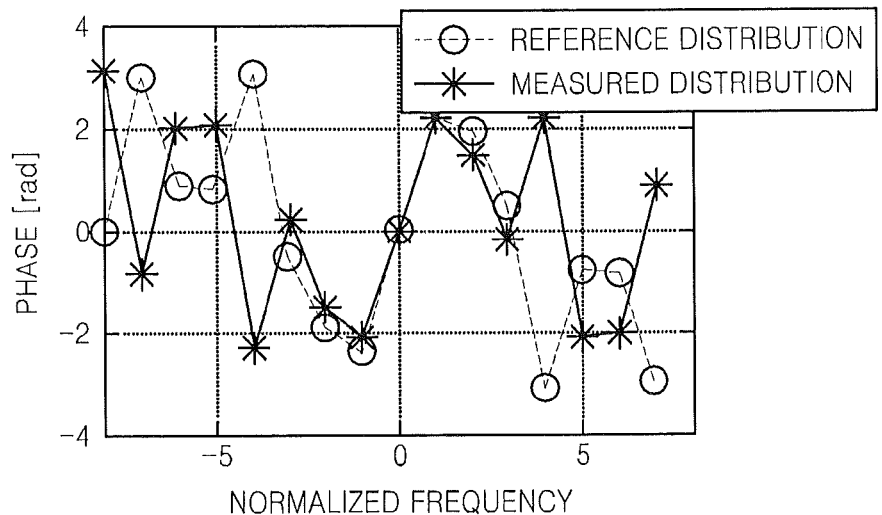
FIG. 15 is a graph showing a phase of the domain-transformed reference distribution and a phase of the domain-transformed measured distribution.

FIG. 15 is an exemplary graph showing a phase of the domain-transformed reference distribution and a phase of the domain-transformed measured distribution.

Referring to FIG. 15, the horizontal axis indicates a normalized frequency, and the vertical axis indicates a phase in the unit of rad. A dotted line indicates a phase of the domain-transformed reference distribution (that is, $\angle \overline{P}[k]$), and a solid line indicates a phase of the domain-transformed measured distribution (that is, $\angle P[k]$).

Figure 16:
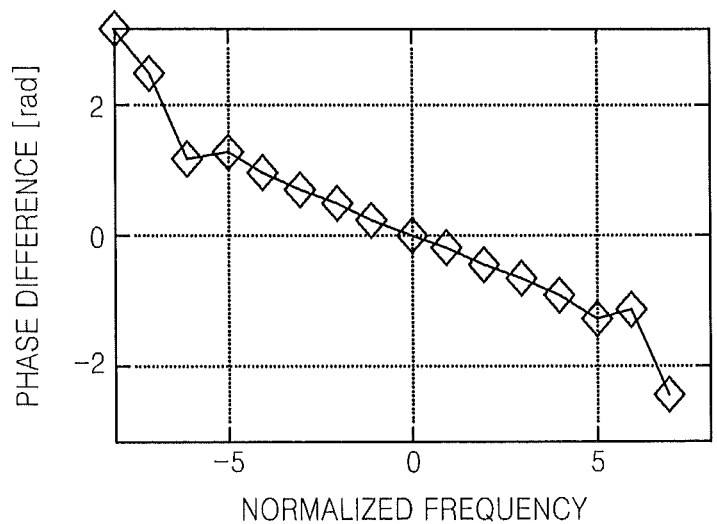
FIG. 16 is a graph showing the phase difference between the domain-transformed reference distribution and the domain-transformed measured distribution.

FIG. 16 is an exemplary graph showing the phase difference between the domain-transformed reference distribution and the domain-transformed measured distribution.

Referring to FIG. 16, the horizontal axis indicates a normalized frequency, and the vertical axis indicates the phase difference y[k] in the unit of rad. Referring to FIG. 16, the phase difference y[k] between the domain-transformed reference distribution and the domain-transformed measured distribution may approximate to a linear function with respect to the normalized frequency.

Referring back to FIG. 14, the distribution center movement value estimation unit 132 may estimate the distribution center movement value $\Delta\hat{V}$ according to the phase difference y[k] received from the phase difference calculation unit 131. In detail, the distribution center movement value estimation unit 132 may apply linear least square fitting to the phase difference y[k] of Equation 6, as shown in Equation 7 below:

$$E = \sum \left( y[k] - \frac{2\pi}{N_{FFT}\Delta} \Delta \hat{V} k \right)^2 \qquad \text{[Equation 7]}$$

where $\Delta$ denotes intervals between the read levels $R_1$, $R_2$, ..., and $R_N$ set for distribution measurement. When $\Delta\hat{V}$ which minimizes E is lead into an equation for y[k], the estimated distribution center movement value $\Delta\hat{V}$ may be expressed as $$\Delta\hat{V} = C \frac{\sum_k k y[k]}{\sum_k k^2} \qquad \text{[Equation 8]}$$

where C denotes a constant and may be expressed as Equation 9 below:

$$C = N_{FFT}\Delta/2\pi \qquad \text{[Equation 9]}$$

When Equation 8 is applied to the graph of FIG. 15, the estimated distribution center movement value $\Delta \hat{V}$ is −0.119 V. In the graph of FIG. 12, since the mean variation $\Delta m$ between the reference distribution and the changed distribution is 0.12 V, it is known that a result of the estimation performed by the distribution center movement value estimation unit 132 is very highly accurate.

The voltage level adjustment unit 140A may adjust a voltage level Vr' of the read voltage according to the distribution center movement value $\Delta \hat{V}$ estimated by the distribution variation estimation unit 130A and the reference read voltage Vr. The reference read voltage Vr is a read voltage at a distribution measured before a change of the threshold voltage, and may be stored in a part of the memory cell array MCA of the memory device 20 or in the external storage medium EM of FIG. 9.

Figure 17:
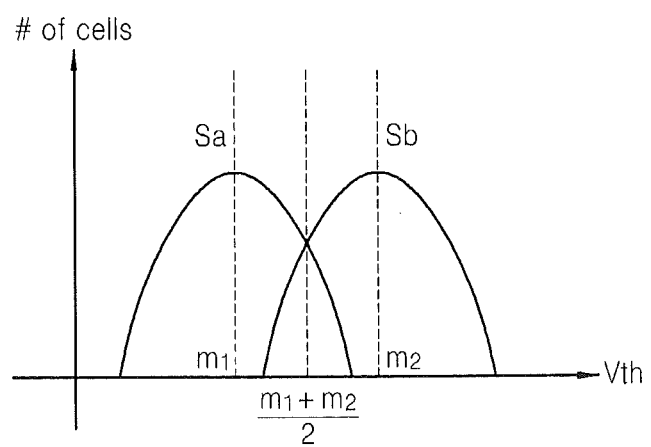
FIG. 17 is an exemplary graph showing two adjacent distributions to explain an operation of the voltage level adjustment unit of FIG. 14.

FIG. 17 is an exemplary graph showing two adjacent distributions to explain an operation of the voltage level adjustment unit of FIG. 14.

Referring to FIG. 17, the horizontal axis indicates the threshold voltage Vth, and the vertical axis indicates the number of memory cells. A first distribution Sa and a second distribution Sb of FIG. 17 may have the same variance. The center level of the first distribution Sa is $m_1$, and the center level of the second distribution Sb is $m_2$. The first and second distributions Sa and Sb may be reference distributions. When a memory cell is a 3-bit memory cell, the first and second distributions Sa and Sb may be distributions corresponding to the third and fourth states S3 and S4, respectively.

In detail, the voltage level adjustment unit 140A of FIG. 14 may adjust the voltage level of the read voltage by using Equation 10 below:

$$\frac{(m_1 + \Delta \hat{V}) + (m_2 + \Delta \hat{V})}{2} = \frac{m_1 + m_2}{2} + \Delta \hat{V} \qquad \text{[Equation 10]}$$

where $$\frac{m_1 + m_2}{2}$$

corresponds to an optimal voltage level Vr of a read voltage applied before distribution center movement. As such, the voltage level adjustment unit 14A may calculate an optimal voltage level Vr' of a read voltage applied after the distribution center movement by adding the estimated distribution center movement value $\Delta \hat{V}$ to the optimal voltage level $$\frac{m_1 + m_2}{2}$$

of the read voltage applied before the distribution center movement.

Figure 18:
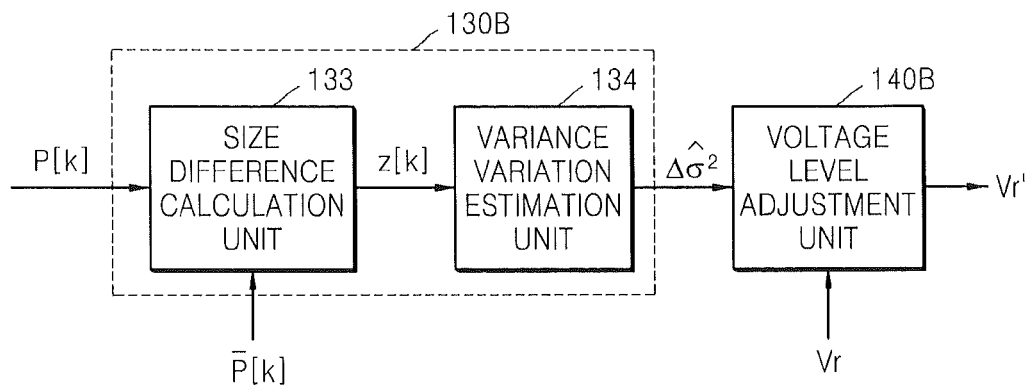
FIG. 18 is a block diagram of a distribution variation estimation unit and a voltage level adjustment unit, which are another example of the distribution variation estimation unit and another example of the voltage level adjustment unit of FIG. 9.

FIG. 18 is a block diagram of a distribution variation estimation unit and a voltage level adjustment unit, which are another example of the distribution variation estimation unit and another example of the voltage level adjustment unit of FIG. 9.

Referring to FIG. 18, the distribution variation estimation unit 130B may include a size difference calculation unit 133 and a variance variation estimation unit 134. Accordingly, when the width of a distribution at a specific state of the semiconductor memory device varies, that is, when the variance of the distribution varies, a variance variation $\Delta \hat{\sigma}^2$ may be estimated based on a size difference between the domain-transformed reference distribution $\overline{P}[k]$ and the domain-transformed measured distribution P[k].

When it is assumed that the threshold voltage V of the semiconductor memory device follows a normalized distribution (that is, a Gaussian distribution) at each state of the semiconductor memory device and when the mean of an i-th level is defined as $m_i$ and the variance of the i-th level is defined as $\sigma_i^2$, a characteristic function of a threshold voltage corresponding to the i-th level may be expressed as Equation 11 below:

$$\Phi_V(v) = \exp\left(jvm_i - \frac{\sigma_i^2 v^2}{2}\right) \qquad \text{[Equation 11]}$$

When a threshold voltage after the width of the distribution is changed is defined as V' and it is assumed that the variance variation of the threshold voltage at the i-th level is $\Delta \sigma^2$, the characteristic function of the threshold voltage V' after the width of the distribution is changed may be expressed as Equation 12 below:

$$\begin{aligned} \Phi_{V'}(v) &= \exp\left(jvm_i - \frac{(\sigma_i^2 + \Delta \sigma^2)v^2}{2}\right) \\ &= \exp\left(-\frac{\Delta \sigma^2 v^2}{2}\right)\exp\left(jvm_i - \frac{\sigma_i^2 v^2}{2}\right) \\ &= \exp\left(-\frac{\Delta \sigma^2 v^2}{2}\right)\Phi_V(v) \end{aligned} \qquad \text{[Equation 12]}$$

When an absolute value is applied to Equation 12 and the absolute value of Equation 12 is changed to a dB scale, Equation 12 may be expressed as Equation 13 below:

$$20\log_{10}|\Phi_{V'}(v)| - 20\log_{10}|\Phi_V(v)| = -20\frac{\Delta \sigma^2}{2\ln 10}v^2 \qquad \text{[Equation 13]}$$

As such, a size difference between the characteristic functions (i.e., $\Phi_V(v)$ and $\Phi_{V'}(v)$) before and after distribution width change may be expressed as a difference between the absolute values of the characteristic functions (i.e., $\Phi_V(v)$ and $\Phi_{V'}(v)$) before and after distribution width change, in the unit of dB scale. The size difference between the characteristic functions (i.e., $\Phi_V(v)$ and $\Phi_{V'}(v)$) before and after distribution width change may be expressed as a quadratic equation for v, and the coefficient of the quadratic equation is proportional to the variance variation $\Delta \sigma^2$. Therefore, when the size difference between the characteristic functions (i.e., $\Phi_V(v)$ and $\Phi_{V'}(v)$) before and after the distribution width change is calculated, and the coefficient of a quadratic equation for the size difference is estimated, the variance variation $\Delta \sigma^2$ of the threshold voltage may be estimated.

However, in the present embodiment, an output of the domain transformation unit 120 of FIG. 9, that is, the domain-transformed measured distribution P[k], instead of the characteristic function may be used. An operation of the distribution variation estimation unit 130B, that is, an arithmetic operation using the domain-transformed measured distribution P[k], will now be described in detail.

The size difference calculation unit 133 may receive the domain-transformed measured distribution P[k] and the domain-transformed reference distribution $\overline{P}[k]$ and calculate a size difference between the domain-transformed measured distribution P[k] and the domain-transformed reference distribution P̄[k]. At this time, the domain-transformed measured distribution P[k] may be received from the domain transformation transformed unit 120 of FIG. 9. As illustrated in FIG. 9, the domain-transformed reference distribution P̄[k] may be received from a part of the memory cell array MCA, for example, from the memory block BLK or may be received from the external storage medium EM. In detail, the size difference calculation unit 133 may calculate the size difference by using Equation 14 below:

$$z[k]=20\log_{10}|P[k]|-20\log_{10}|\overline{P}[k]|$$ [Equation 14]

where P̄[k] indicates the domain-transformed reference distribution (for example, a result of IFFT on a reference distribution), P[k] indicates the domain-transformed measured distribution (for example, a result of IFFT on a changed measured distribution), and z[k] indicates a size difference between the domain-transformed measured distribution P[k] and the domain-transformed reference distribution P̄[k]. P[k] and P̄[k] may be results of IFFT on distributions measured at equal intervals.

Figure 19:
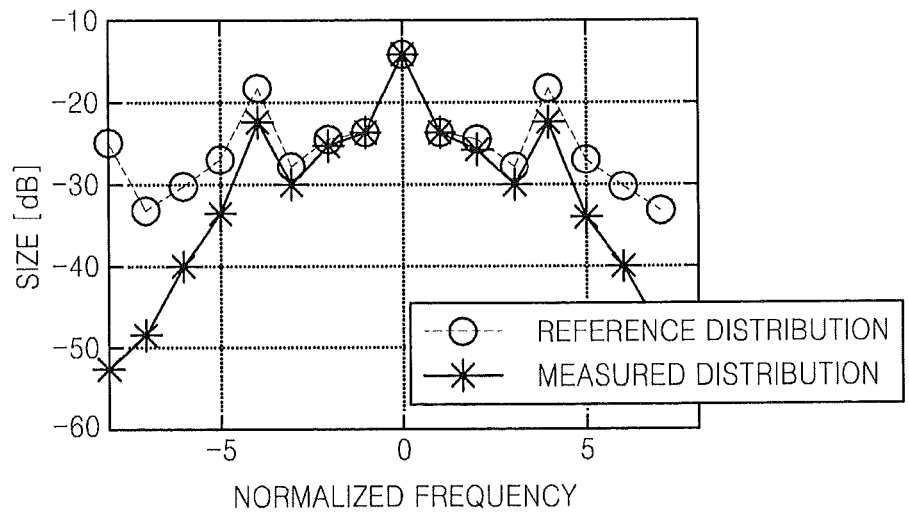
FIG. 19 is an exemplary graph showing a size of the domain-transformed reference distribution and a size of the domain-transformed measured distribution.

FIG. 19 is an exemplary graph showing a size of the domain-transformed reference distribution and a size of the domain-transformed measured distribution.

Referring to FIG. 19, the horizontal axis indicates a normalized frequency, and the vertical axis indicates a size in the unit of dB. A dotted line indicates the size of the domain-transformed reference distribution (that is, $20\log_{10}|\overline{P}[k]|$), and a solid line indicates the size of the domain-transformed measured distribution (that is, $20\log_{10}|P[k]|$).

Figure 20:
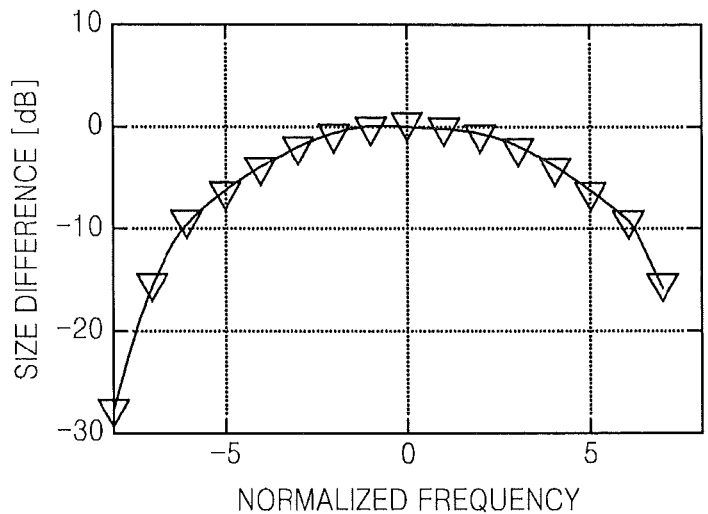
FIG. 20 is a graph showing the size difference between the domain-transformed reference distribution and the domain-transformed measured distribution.

FIG. 20 is an exemplary graph showing the size difference between the domain-transformed reference distribution and the domain-transformed measured distribution.

Referring to FIG. 20, the horizontal axis indicates a normalized frequency, and the vertical axis indicates the size difference z[k] in the unit of dB. Referring to FIG. 20, the size difference z[k] between the domain-transformed reference distribution and the domain-transformed measured distribution may approximate to a quadrature function with respect to the normalized frequency.

Referring back to FIG. 18, the variance variation estimation unit 134 may estimate the variance variation $\Delta\hat{\sigma}^2$ according to the size difference z[k] received from the size difference calculation unit 133. In detail, the variance variation estimation unit 134 may apply linear least square fitting to the size difference z[k] of Equation 14, as shown in Equation 15 below:

$$E = \sum \left(z[k] - \left(-\frac{10}{\ln 10}\left(\frac{2\pi}{N_{FFT}\Delta}\right)^2 \Delta\hat{\sigma}^2 k^2\right)\right)^2$$ [Equation 15]

where Δ denotes intervals between the read levels $R_1$, $R_2$, ..., and $R_N$ set for distribution measurement. When the variance variation $\Delta\hat{\sigma}^2$, which minimizes E, is lead into an equation for the size difference z[k], the estimated variance variation $\Delta\hat{\sigma}^2$ may be expressed as Equation 16 below:

$$\Delta\hat{\sigma}^2 = C' \frac{\sum_k k^2 z[k]}{\sum_k k^4}$$ [Equation 16]

where C' denotes a constant and may be expressed as Equation 17 below:

$$C' = \left(\frac{N_{FFT}\Delta}{2\pi}\right)^2 \frac{\ln 10}{10}$$ [Equation 17]

When Equation 16 is applied to the graph of FIG. 20, the estimated variance variation $\Delta\hat{\sigma}^2$ is 0.0152. In the graph of FIG. 12, since the variance variation $\Delta\sigma^2$ between the reference distribution and the changed distribution is 0.015, it is known that a result of the estimation performed by the variance variation estimation unit 134 is very highly accurate.

The voltage level adjustment unit 140B may adjust a voltage level Vr' of the read voltage according to the variance variation $\Delta\hat{\sigma}^2$ estimated by the distribution variation estimation unit 130B and the reference read voltage Vr. The reference read voltage Vr is a read voltage at a distribution measured before a change of the threshold voltage, and may be stored in a part of the memory cell array MCA of the memory device 20 or in the external storage medium EM of FIG. 9.

Figure 21:
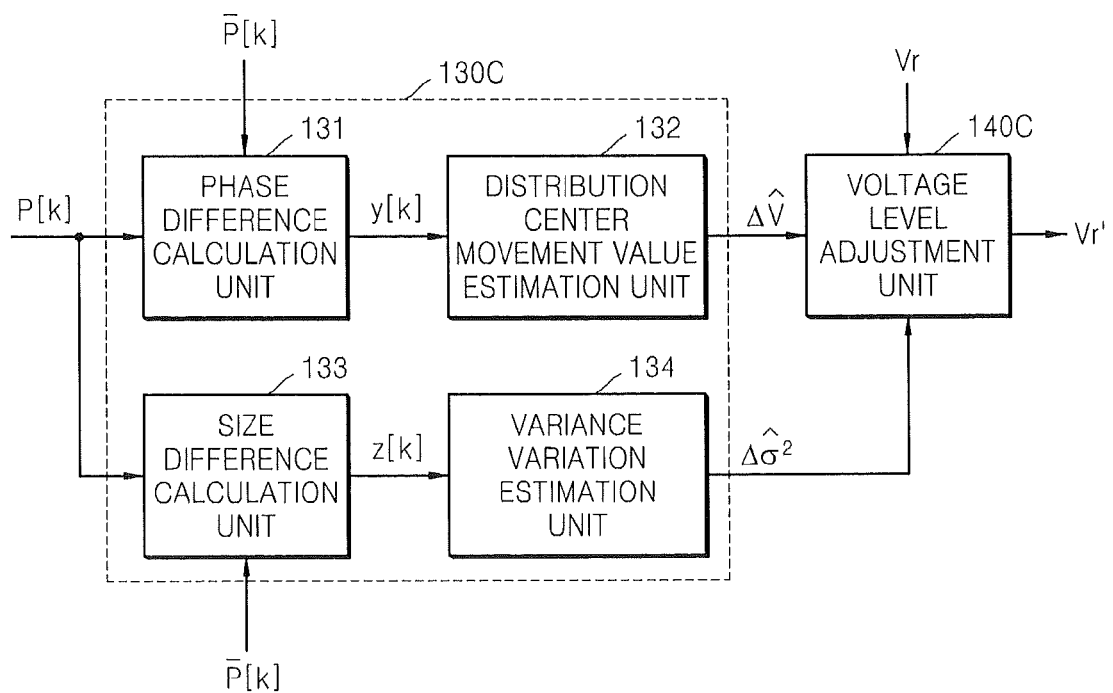
FIG. 21 is a block diagram of a distribution variation estimation unit and a voltage level adjustment unit, which are another example of the distribution variation estimation unit and another example of the voltage level adjustment unit of FIG. 9.

FIG. 21 is a block diagram of a distribution variation estimation unit and a voltage level adjustment unit, which are another example of the distribution variation estimation unit and another example of the voltage level adjustment unit of FIG. 9.

Referring to FIG. 21, the distribution variation estimation unit 130C may include a phase difference calculation unit 131, a distribution center movement value estimation unit 132, a size difference calculation unit 133, and a variance variation estimation unit 134. Accordingly, when a distribution center and/or variance in a specific state of memory cells varies, a distribution center movement value and/or a variance variation may be estimated based on a size difference between a domain-transformed reference distribution and a domain-transformed changed distribution, and thus a distribution variation may be estimated.

The phase difference calculation unit 131 and the distribution center movement value estimation unit 132 may operate substantially equal to the counterpart components included in the distribution variation estimation unit 130A of FIG. 14, and the size difference calculation unit 133 and the variance variation estimation unit 134 may operate substantially the same as the counterpart components included in the distribution variation estimation unit 130B of FIG. 18. Accordingly, detailed descriptions of the operations of the phase difference calculation unit 131, the distribution center movement value estimation unit 132, the size difference calculation unit 133, and the variance variation estimation unit 134 will be omitted.

The voltage level adjustment unit 140C may adjust the voltage level Vr' of the read voltage according to the distribution center movement value $\Delta\hat{V}$ estimated by the distribution variation estimation unit 130C, the variance variation $\Delta\hat{\sigma}^2$ estimated by the distribution variation estimation unit 130C, and the reference read voltage Vr. The reference read voltage Vr is a read voltage at a distribution measured before a change of the threshold voltage, and may be stored in a part of the memory cell array MCA of the memory device 20 or in the external storage medium EM of FIG. 9.

In detail, when it is assumed that a mean and a variance of a distribution at each state are ascertain by using values output by the distribution variation estimation unit 130C, the voltage level adjustment unit 140C may determine an optimal voltage level X of a read voltage by using Equation 18 below:

$$\frac{(x - m'_i)^2}{\sigma'^2_i} + \ln\sigma'^2_i = \frac{(x - m'_{i+1})^2}{\sigma'^2_{i+1}} + \ln\sigma'^2_{i+1} \quad \text{[Equation 18]}$$

where $m'_i$ is a mean of a changed i-th distribution after change and may approximate to $m_i + \Delta V$. $\sigma'^2_i$ is a variance of the changed i-th distribution and may approximate to $\sigma_i^2 + \Delta\sigma^2$. As such, when it is assumed that a distribution at each state follows the normalized distribution, the optimal voltage level x of the read voltage may be determined by finding voltage values where the probability density functions of two adjacent states are identical to each other.

As described above, in some embodiments according to the inventive concept, the distribution measurement unit 110, the domain transformation unit 120, the distribution variation estimation unit 130, and the voltage level adjustment unit 140 may be included in a memory controller 10A of FIG. 8. However, in some embodiments according to the inventive concept, the distribution measurement unit 110, the domain transformation unit 120, and the distribution variation estimation unit 130 may be included in the memory controller 10A of FIG. 8, and the voltage level adjustment unit 140 may be included in the memory device 20 of FIG. 8. According to another embodiment, the distribution measurement unit 110 and the domain transformation unit 120 may be included in the memory controller 10A of FIG. 8, and the distribution variation estimation unit 130 and the voltage level adjustment unit 140 may be included in the memory device 20 of FIG. 8. Accordingly, the number of times the memory controller 10A performs a read operation on the memory device 20 may be reduced.

Figure 22:
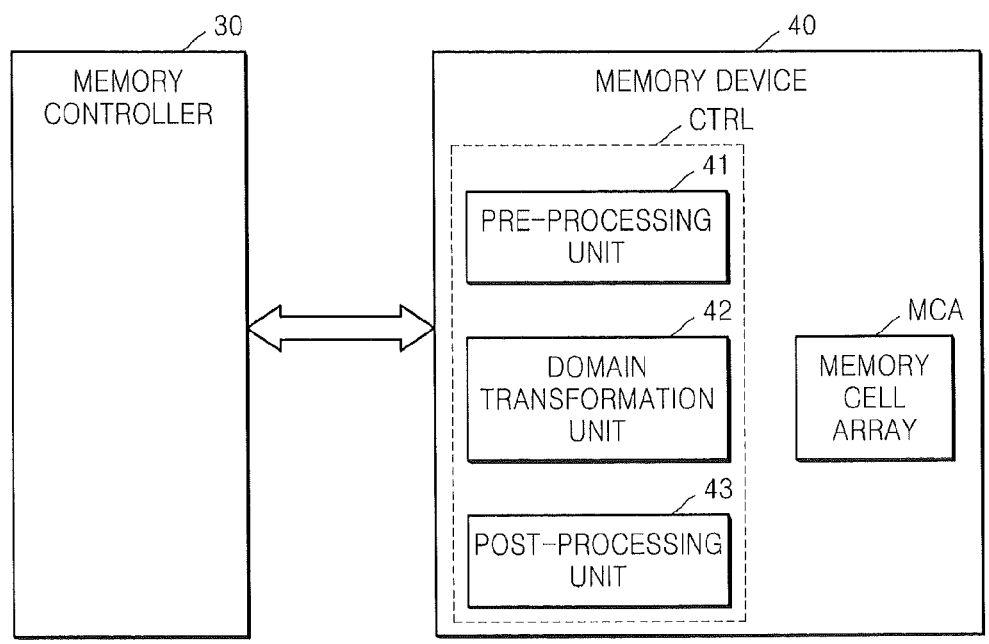
FIG. 22 is a block diagram of a semiconductor memory system according to another embodiment of the inventive concept.

FIG. 22 is a block diagram of a semiconductor memory system according to another embodiment of the inventive concept.

Referring to FIG. 22, the semiconductor memory system 2 may include a memory controller 30 and a memory device 40. The memory device 40 may include a memory cell array MCA and a control unit CTRL, and the control unit CTRL may include a pre-processing unit 41, a domain transformation unit 42, and a post-processing unit 43.

The memory cell array MCA may include a plurality of memory cells. The control unit CTRL may perform domain transformation on data written to or read out from the plurality of memory cells and perform signal processing on domain-transformed data to output processed data or a control signal.

In detail, the pre-processing unit 41 may perform pre-processing on data so that the preprocessed data has a format suitable for signal processing. The domain transformation unit 42 may transform pre-processed data from a first domain to a second domain. The post-processing unit 43 may perform post-processing on data of the second domain to output the processed data or the control signal.

The semiconductor memory system 2 according to the present embodiment is a modification of the semiconductor memory system 1 of FIG. 1, and thus descriptions made above with reference to FIG. 1 may equal apply to the semiconductor memory system 2. In detail, the pre-processing unit 11, the domain transformation unit 12, and the post-processing unit 13 of the semiconductor memory system 1 of FIG. 1 are included in the memory controller 10, whereas the pre-processing unit 41, the domain transformation unit 42, and the post-processing unit 43 of the semiconductor memory system 2 according to the present embodiment may be included in the memory device 40. Accordingly, load generated when signal input and output occur between the memory controller 30 and the memory device 40 may be reduced.

Figure 23:
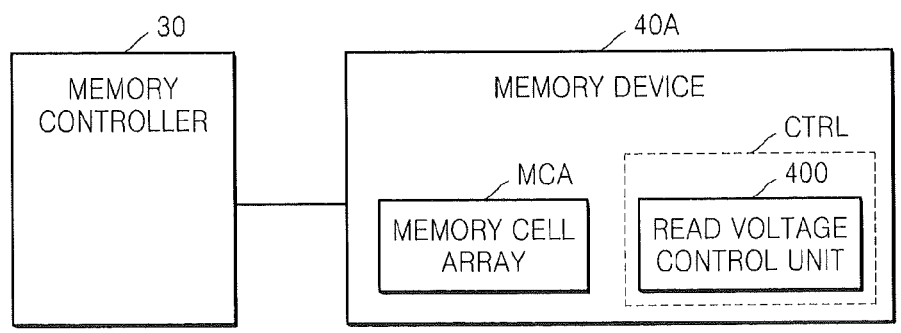
FIG. 23 is a block diagram of a semiconductor memory system, which is an example of the semiconductor memory system of FIG. 22.

FIG. 23 is a block diagram of a semiconductor memory system, which is an example of the semiconductor memory system of FIG. 22.

Referring to FIG. 23, the semiconductor memory system 2A may include a memory controller 30 and a memory device 40A. The memory device 40A may include a memory cell array MCA and a control unit CTRL, and the control unit CTRL may include a read voltage control unit 400. In detail, the read voltage control unit 400 may perform domain transformation on data read from the memory cells included in the memory cell array MCA and estimate a distribution variation for the memory cells according to domain-transformed data, which is a result of the domain transformation, thereby controlling the voltage level of a read voltage for reading the data.

The semiconductor memory system 2A according to the present embodiment is a modification of the semiconductor memory system 1A of FIG. 2, and thus descriptions made above with reference to FIG. 2 may equal apply to the semiconductor memory system 2A. The read voltage control unit 400 of the semiconductor memory system 2A may be included in the memory device 40A not in the memory controller 30. Accordingly, load generated when signal input and output occur between the memory controller 30 and the memory device 40A may be reduced.

Figure 24:
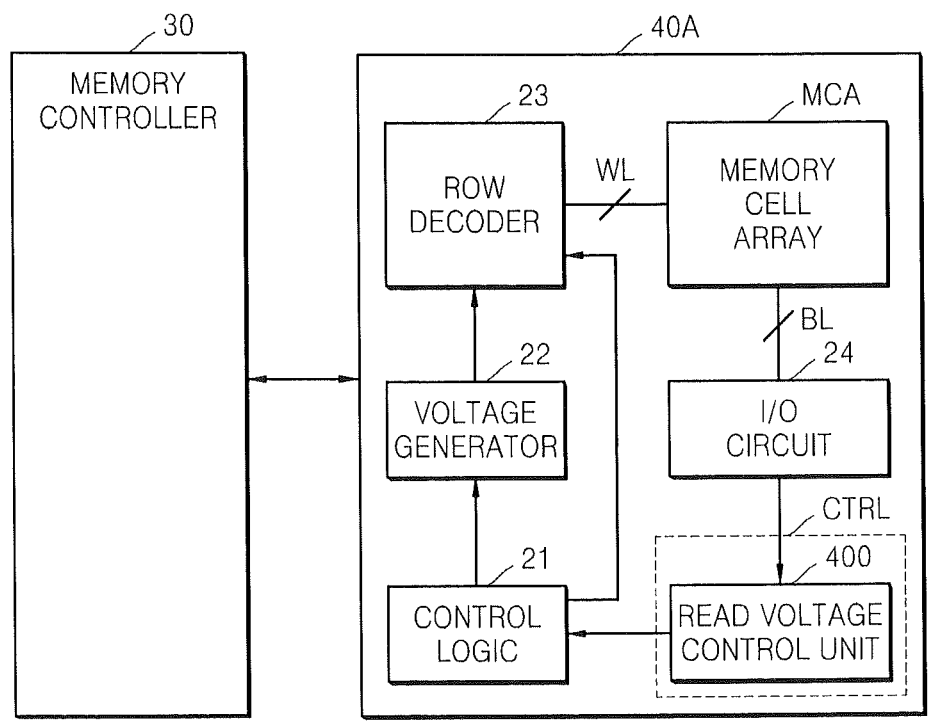
FIG. 24 is a block diagram illustrating the semiconductor memory system of FIG. 23 in greater detail.

FIG. 24 is a block diagram illustrating the semiconductor memory system of FIG. 23 in greater detail.

Referring to FIG. 24, the semiconductor memory system 2A may include the memory controller 30 and the memory device 40A, and the memory device 40A may include the memory cell array MCA, a control logic 21, a voltage generator 22, a row decoder 23, a I/O circuit 24, and the read voltage control unit 400. Descriptions made above with reference to FIG. 8 may equal apply to the semiconductor memory system 2A according to the present embodiment. Descriptions made above with reference to FIGS. 9 through 21 may equal apply to the read voltage control unit 400 according to the present embodiment.

Semiconductor memory devices and/or memory controllers according to embodiments of the inventive concept may be implemented using various types of packages. For example, the semiconductor memory devices and/or memory controllers according to embodiments of the inventive concept may be implemented using packages such as a Package on Package (PoP), Ball grid arrays (BGAs), Chip scale packages (CSPs), a Plastic Leaded Chip Carrier (PLCC), a Plastic Dual In-Line Package (PDIP), a Die in Waffle Pack, a Die in Wafer Form, a Chip On Board (COB), a Ceramic Dual In-Line Package (CERDIP), a Plastic Metric Quad Flat Pack (MQFP), a Thin Quad Flatpack (TQFP), a Small Outline (SOIC), a Shrink Small Outline Package (SSOP), a Thin Small Outline (TSOP), a Thin Quad Flatpack (TQFP), a System In Package (SIP), a Multi Chip Package (MCP), a Wafer-level Fabricated Package (WFP), and a Wafer-Level Processed Stack Package (WSP).

Figure 25:
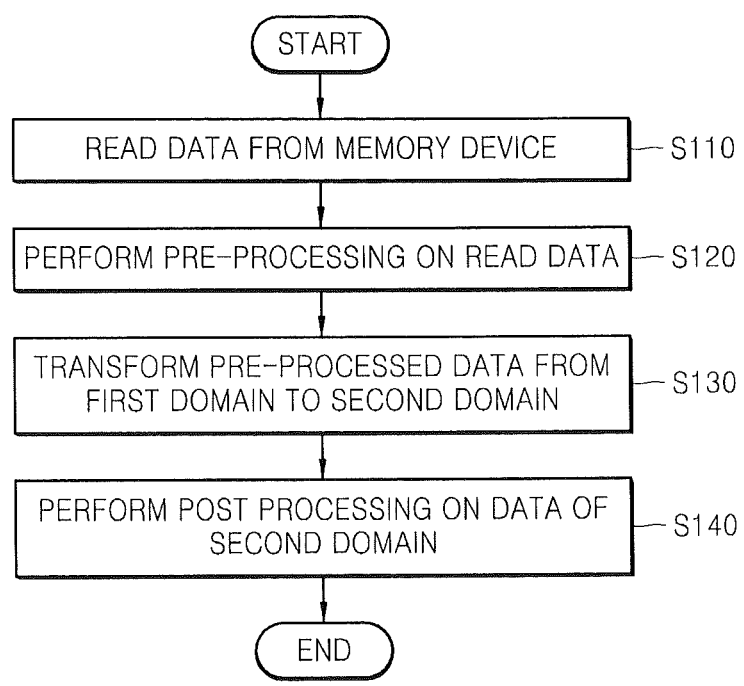
FIG. 25 is a flowchart of a signal processing method performed in a semiconductor memory system, according to an embodiment of the inventive concept.

FIG. 25 is a flowchart of a signal processing method performed in a semiconductor memory system, according to an embodiment of the inventive concept.

The signal processing method of FIG. 25 corresponds to a signal processing method performed in the semiconductor memory devices or the semiconductor memory systems illustrated in FIGS. 1 through 24. Accordingly, descriptions made above with reference to FIGS. 1 through 24 may be equally applied to the present embodiment.

In operation S110, data is read from a memory device. Alternatively, instead of operation S110, an operation of receiving data desired to be written to the memory device may be included.

In operation S120, pre-processing is performed on the read data. In detail, in operation S120, pre-processing may be performed on the read data so that the pre-processed data has a format suitable for signal processing.

In operation S130, pre-processed data, which is a result of the pre-processing, is transformed from a first domain to a second domain. In detail, at least one selected from the group consisting of Abel transform, Bateman transform, Fourier transform, STFT, Hankel transform, Hartley transform, Hilbert transform, Hilbert-Schmidt integral operator, Laplace transform, Two-sided Laplace transform, LST, LCT, Mellin transform, Poisson-Mellin-Newton cycle, Radon transform, Stieltjes transform, Sumudu transform, Laplace-Carson transform, wavelet transform, Binomial transform, discrete Fourier transform, fast Fourier transform, discrete cosine transform, modified discrete cosine transform, discrete Hartley transform, discrete sine transform, discrete wavelet transform, fast wavelet transform, IBDWT, Number-theoretic transform, Stirling transform, Z-transform, Karhunen-Loève transform, Bäcklund transform, bilinear transform, Box-Muller transform, Burrows-Wheeler transform, Chirplet transform, distance transform, Fractal transform, Hadamard transform, Hough transform, Legendre transform, Möbius transform, perspective transform, Y-delta transform, Hayesian transform, and the inverse of each of the aforementioned transforms, may be performed on the pre-processed data. For example, the first domain may be a time domain, and the second domain may be a frequency domain.

In operation S140, post processing is performed on data whose domain has been transformed from the first domain to the second domain, that is, on data of the second domain. In detail, at least one selected from the group consisting of maximum likelihood estimation/detection, Bayesian estimation/detection, moment estimation, MMSE, MAP estimation/detection, MVUE, BLUE, least square estimation, unbiased estimators, particle filter, MCMC, Kalman filter, MnKF, and Wiener filter may be performed on the data of the second domain.

Figure 26:
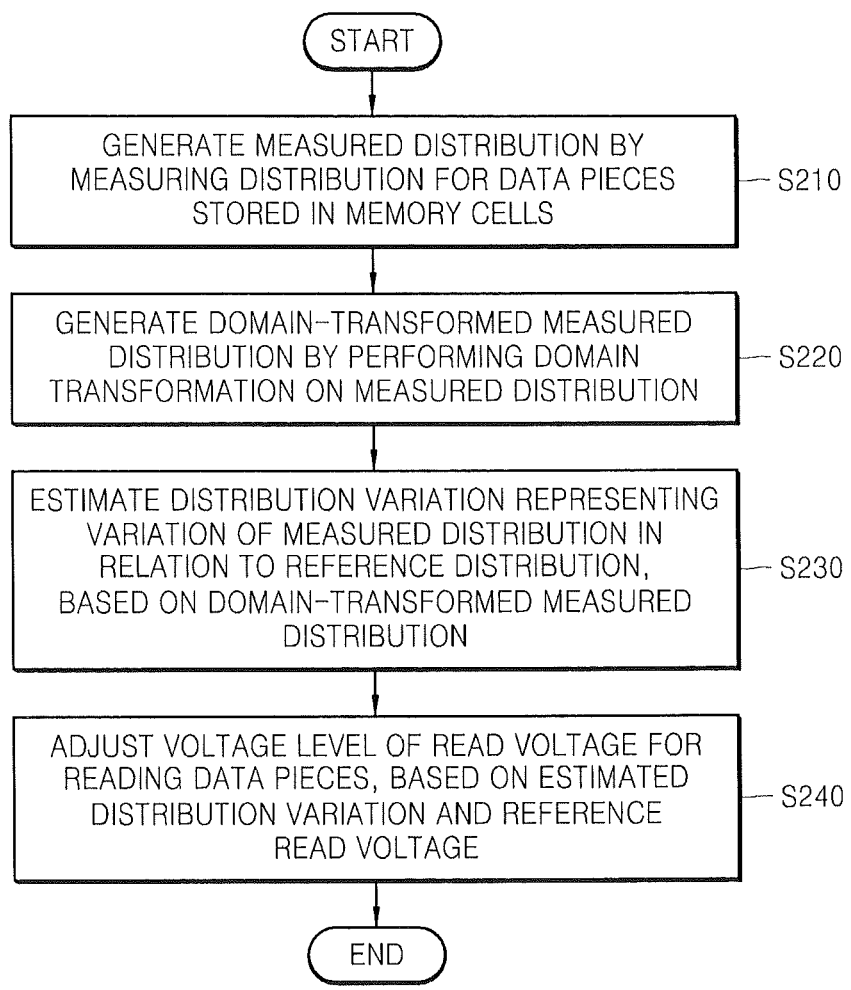
FIG. 26 is a flowchart of a read level controlling method performed in a semiconductor memory system according to an embodiment of the inventive concept.

FIG. 26 is a flowchart of a read level controlling method performed in a semiconductor memory system, according to an embodiment of the inventive concept.

The read voltage controlling method of FIG. 26 corresponds to a read voltage controlling method performed in the semiconductor memory devices or the semiconductor memory systems illustrated in FIGS. 1 through 24. Accordingly, descriptions made above with reference to FIGS. 1 through 24 may equal apply to the present embodiment.

In operation S210, a measured distribution is generated by measuring a distribution for a plurality of pieces of data stored in a plurality of memory cells. In detail, a plurality of read levels for measuring the distribution for the memory cells may be set, and a read operation on the memory cells may be performed at each of the read levels. Then, the number of pieces of data '1' or '0' from among pieces of data read at each of the read levels may be calculated, a histogram may be generated based on the result of the calculation, and the generated histogram may be used as the measured distribution.

In operation S220, a domain-transformed measured distribution is generated by performing domain transformation on the measured distribution. In detail, the domain-transformed measured distribution may be generated by performing, on the measured distribution, at least one selected from the group consisting of Abel transform, Bateman transform, Fourier transform, STFT, Hankel transform, Hartley transform, Hilbert transform, Hilbert-Schmidt integral operator, Laplace transform, Two-sided Laplace transform, LST, LCT, Mellin transform, Poisson-Mellin-Newton cycle, Radon transform, Stieltjes transform, Sumudu transform, Laplace-Carson transform, wavelet transform, Binomial transform, discrete Fourier transform, fast Fourier transform, discrete cosine transform, modified discrete cosine transform, discrete Hartley transform, discrete sine transform, discrete wavelet transform, fast wavelet transform, IBDWT, Number-theoretic transform, Stirling transform, Z-transform, Karhunen-Loève transform, Bäcklund transform, bilinear transform, Box-Muller transform, Burrows-Wheeler transform, Chirplet transform, distance transform, Fractal transform, Hadamard transform, Hough transform, Legendre transform, Möbius transform, perspective transform, Y-delta transform, Hayesian transform, and the inverse of each of the aforementioned transforms.

In operation S230, a distribution variation representing a variation of the measured distribution in relation to a reference distribution is estimated based on the domain-transformed measured distribution. According to an embodiment, a phase difference between the domain-transformed measured distribution and a domain-transformed reference distribution may be calculated, and a distribution center movement value of the measured distribution in relation to the reference distribution may be estimated based on the phase difference. According to another embodiment, a size difference between the domain-transformed measured distribution and the domain-transformed reference distribution may be calculated, and a variance variation of the measured distribution in relation to the reference distribution may be estimated based on the size difference. According to another embodiment, the phase difference and the size difference between the domain-transformed measured distribution and the domain-transformed reference distribution may be calculated, and the distribution center movement value and the variance variation of the measured distribution in relation to the reference distribution may be estimated based on the size difference and the phase difference.

In operation S240, the voltage level of a read voltage for reading the data pieces is adjusted based on the estimated distribution variation and a reference read voltage.

The aforementioned read voltage controlling method performed in the semiconductor memory device can be embodied as program commands executable by various computer means and can be recorded on a computer-readable recording medium.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Exemplary embodiments are described herein with reference to flowchart and/or block diagram illustrations of methods, systems, and computer program products in accordance with exemplary embodiments. These flowchart and/or block diagrams further illustrate exemplary operations for authenticating the identity of a user by combining multiple authentication techniques to generate a composite numerical confidence indicator of the identity of the user, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The flowcharts herein illustrate the architecture, functionality, and operations of some embodiments of the inventive concept. In this regard, each block can represent a module, segment, or portion of code, which comprises one or more executable instructions for implementing the specified logical function(s). It should also be noted that in other implementations, the function(s) noted in the blocks may occur out of the order shown in the flowcharts. For example, two blocks shown in succession may, in fact, be executed substantially concurrently or the blocks may sometimes be executed in the reverse order, depending on the functionality involved.

Figure 27:
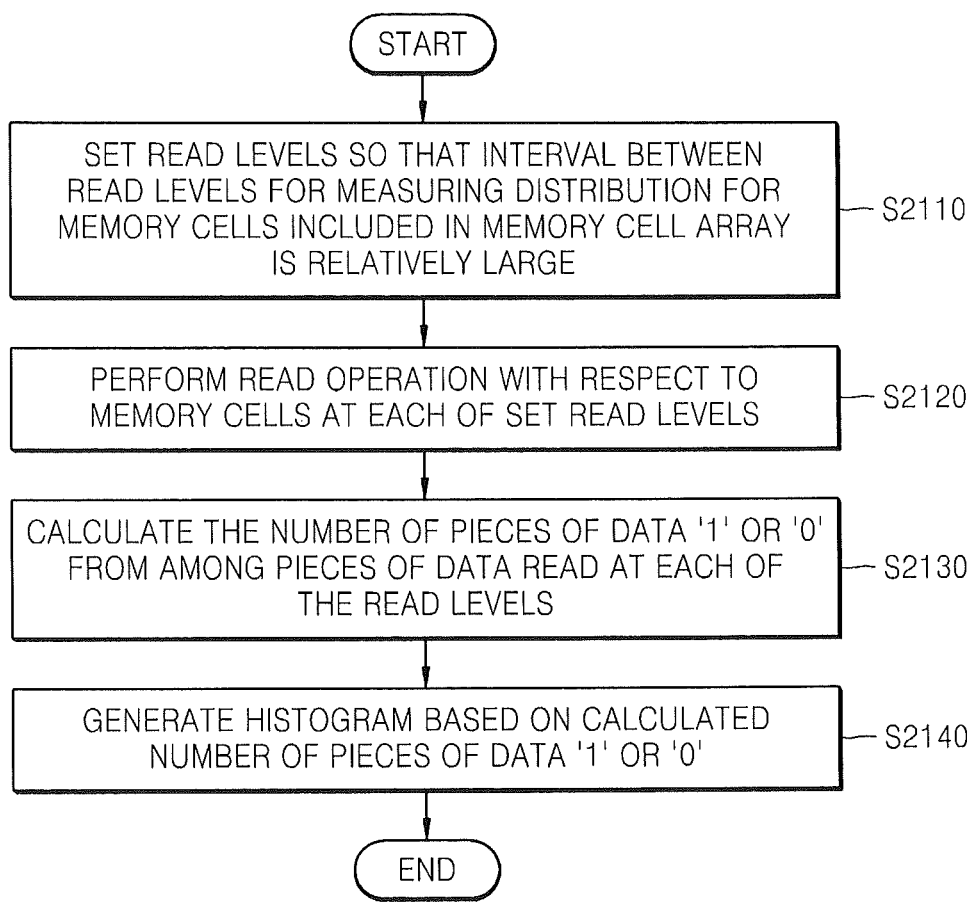
FIG. 27 is a flowchart illustrating a measured distribution generating operation included in the read level controlling method of FIG. 26.

FIG. 27 is a flowchart illustrating the measured distribution generating operation S210 included in the read level controlling method of FIG. 26.

The measured distribution generating operation of FIG. 27 represents a method described above with reference to FIGS. 9 through 13 in which the distribution measurement unit 110 generates the measured distribution. Accordingly, descriptions with reference to FIGS. 9 through 13 may equally apply to the present embodiment.

In operation S2110, a plurality of read levels are set so that an interval between the read levels for measuring a distribution for a plurality of memory cells included in a memory cell array is relatively large. For example, the interval between the read levels may be about 200 mV. As such, due to the setting of the interval between the read levels to be relatively large, the resolution of the read levels may be relatively decreased. According to the present embodiment, even when the resolution between the read levels is relatively low, the reliability of distribution variation estimation may be improved by estimating a distribution variation for the memory cells according to domain-transformed data.

In operation S2120, a read operation with respect to the memory cells is performed at each of the set read levels. As such, since the number of read levels can be reduced and the number of times the read operation with respect to the memory cells is performed can be reduced in the operations S2110 and S2120, the number of calculations performed for distribution measurement can be reduced.

In operation S2130, the number of pieces of data '1' or '0' read at each of the read levels is calculated.

In operation S2140, a histogram is generated based on the calculated number of pieces of data '1' or '0'. The generated histogram may be used as the measured distribution.

Figure 28:
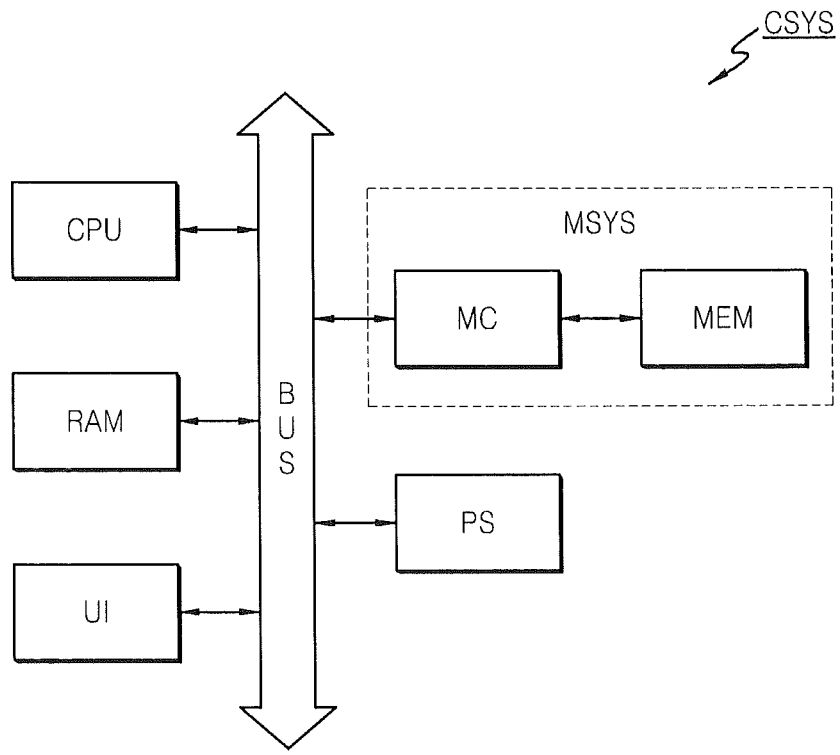
FIG. 28 is a block diagram of a computing system according to an embodiment of the inventive concept.

FIG. 28 is a block diagram of a computing system according to an embodiment of the inventive concept.

Referring to FIG. 28, the computing system CSYS may include a central processing unit (CPU), a user interface (UI), and a semiconductor memory system (MSYS) which are electrically connected to a BUS. The MSYS may include a memory controller (MC) and a semiconductor memory device (MEM). N-bit data (where N is an integer equal to or greater than 1) which has been processed and/or is to be processed by the CPU may be stored in the MEM. The semiconductor memory systems 1, 1A, 2, and 2A described above with reference to FIGS. 1 through 24 may be applied to the MSYS according to the present embodiment.

The computing system CSYS according to the present embodiment may further include a power supplier (PS). When the MEM is a flash memory device, the computing system CSYS according to the present embodiment may further include a volatile memory device (for example, RAM).

When the computing system CSYS according to the present embodiment is a mobile device, a modem such as a battery or a baseband chipset for supplying an operating voltage of the computing system CSYS may be additionally provided. An application chipset, a Camera Image Processor (CIS), a mobile DRAM, and the like may be further included in the computing system CSYS according to the present embodiment. The MEM stores data and thus may constitute a Solid State Drive/Disk (SSD) that uses a non-volatile memory.

Figure 29:
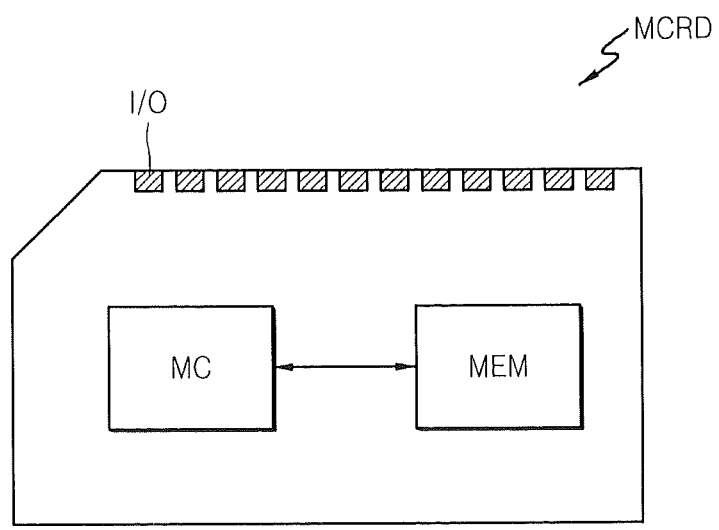
FIG. 29 is a block diagram of a memory card according to an embodiment of the inventive concept.

FIG. 29 is a block diagram of a memory card according to an embodiment of the inventive concept.

Referring to FIG. 29, the memory card MCRD may include a memory controller MC and a semiconductor memory device MEM. The MC may control data writing to the MEM or data reading from the MEM in response to a request of an external host which is received through an I/O unit I/O. When the MEM is a flash memory device, the MC may control an erase operation on the MEM. The MC of the memory card MCRD may include interface units performing interfaces between the external host and the MEM, a RAM, and the like, in order to perform the above-described control operations. The MEM of the memory card MCRD may be the memory device illustrated in FIGS. 1 through 24.

The memory card MCRD of FIG. 29 may be implemented as a Compact Flash Card (CFC), a microdrive, a Smart Media Card (SMC), a Multimedia Card (MMC), a Security Digital Card (SDC), a Memory Stick, a USB flash memory driver, or the like.

Figure 30:
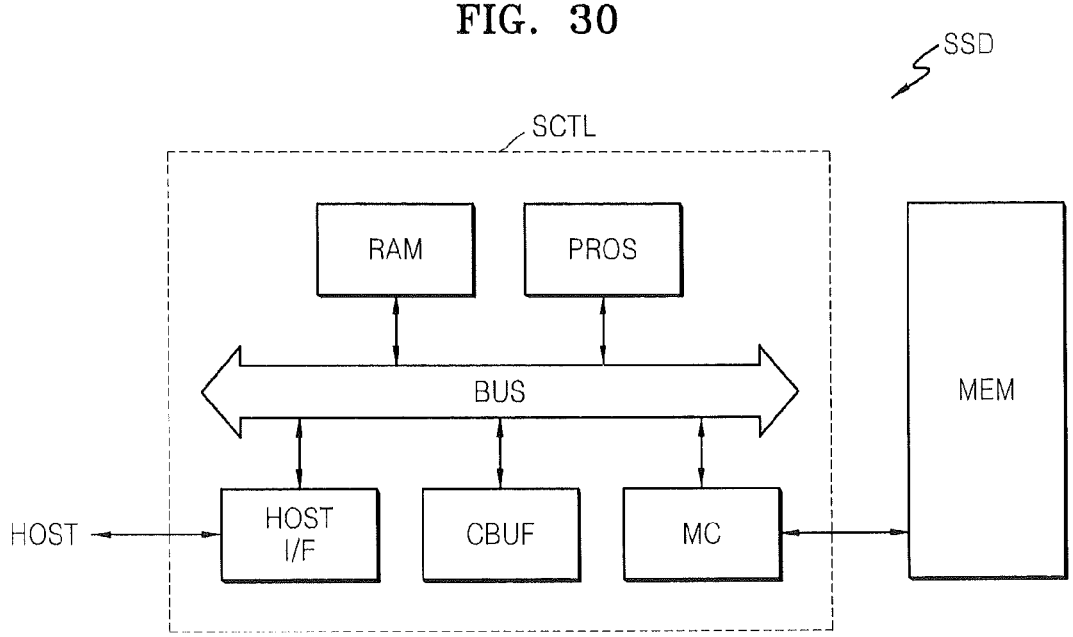
FIG. 30 is a block diagram of a solid state drive (SSD) according to an embodiment of the inventive concept.

FIG. 30 is a block diagram of a solid state drive (SSD) according to an embodiment of the inventive concept.

Referring to FIG. 30, the SSD may include an SSD controller SCTL and a memory device MEM. The SSD controller SCTL may include a processor (PROS), a RAM, a cache buffer (CBUF), and a memory controller MC which are connected to a BUS. The PROS controls the MC to transmit or receive data to and from the MEM in response to a request (a command, an address, and data) of a host. The PROS and the MC of the SSD may be implemented into a single ARM processor. Data necessary for an operation of the PROS may be loaded into the RAM.

A host interface (I/F) may receive the request of the host and transmit the same to the PROS, or transmit data received from the MEM to the host. The host I/F may interface with the host by using various interface protocols such as a Universal Serial Bus (USB), Multi-Media Card (MMC), Peripheral Component Interconnect-Express (PCI-E), Serial Advanced Technology Attachment (SATA), Parallel Advanced Technology Attachment (PATA), a Small Computer System Interface (SCSI), an Enhanced Small Device Interface (ESDI), Intelligent Drive Electronics (IDE), and the like. The data that is desired to be transmitted to the MEM or has been received from the MEM may be stored temporarily in the CBUF. The CBUF may be a SRAM or the like.

The MC and the MEM of the SSD may be respectively the memory controller and the memory device illustrated in FIGS. 1 through 24.

While the inventive concept has been particularly shown and described with reference to exemplary embodiments thereof, it will be understood that various changes in form and details may be made therein without departing from the spirit and scope of the following claims.

What is claimed is:

1. A semiconductor memory system comprising:
    a memory device comprising a memory cell array including a plurality of memory cells; and
    a memory controller configured to perform domain transformation on data written to and/or read from the plurality of memory cells to provide domain-transformed data and perform signal processing on the domain-transformed data to output processed data or a control signal.

2. The semiconductor memory system of claim 1, wherein the memory controller is configured to transform the data from a time domain to a frequency domain to provide the domain-transformed data.

3. The semiconductor memory system of claim 1, wherein the memory controller comprises:
    a pre-processing unit configured to pre-process the data to provide the processed data in a format suitable for the signal processing;
    a domain transformation unit configured to transform the pre-processed data from a first domain to a second domain to provide transformed data; and
    a post-processing unit configured to post-process the transformed data of the second domain to output the processed data or the control signal.

4. The semiconductor memory system of claim 3, wherein the domain transformation unit is configured to perform at least one transform or inverse transform selected from the group consisting of a Fourier transform, a Hilbert transform, and a Laplace transform, on the pre-processed data.

5. The semiconductor memory system of claim 3, wherein the post-processing unit is configured to perform at least one selected from the group consisting of maximum likelihood estimation/detection and Bayesian estimation/detection, on the transformed data of the second domain.

6. The semiconductor memory system of claim 1, wherein the memory controller comprises a read voltage control unit configured to perform domain transformation on the data read from the plurality of memory cells and estimate a distribution variation for the plurality of memory cells based on the domain transformed data to provide an estimated distribution variation, thereby controlling a voltage level of a read voltage for reading the data.

7. The semiconductor memory system of claim 6, wherein the read voltage control unit comprises:
    a distribution measurement unit configured to measure a distribution for the data to provide a measured distribution;
    a domain transformation unit configured to perform domain transformation on the measured distribution to provide a domain-transformed measured distribution; and
    a distribution variation estimation unit configured to estimate the distribution variation based on the domain-transformed measured distribution, wherein the distribution variation represents a variation of the measured distribution in relation to a reference distribution.

8. The semiconductor memory system of claim 7, wherein the read voltage control unit further comprises:
    a voltage level adjustment unit configured to adjust the voltage level of the read voltage based on the estimated distribution variation and a reference read voltage.

9. The semiconductor memory system of claim 7, wherein the domain transformation unit is configured to perform at least one transform or inverse transform selected from the group consisting of a Fourier transform, a Hilbert transform, and a Laplace transform, on the measured distribution to generate the domain-transformed measured distribution.

10. The semiconductor memory system of claim 7, wherein the distribution variation estimation unit comprises:
    a phase difference calculation unit configured to calculate a phase difference between the domain-transformed measured distribution and a domain-transformed reference distribution; and
    a distribution center movement estimation unit configured to estimate a distribution center movement of the measured distribution in relation to the reference distribution based on the phase difference.

11. The semiconductor memory system of claim 10, wherein the phase difference calculation unit is configured to receive the reference distribution or the domain-transformed reference distribution from at least one selected from the group consisting of a part of the memory cell array and an external storage medium.

12. The semiconductor memory system of claim 7, wherein the distribution variation estimation unit comprises:
    a size difference calculation unit configured to calculate a size difference between the domain-transformed measured distribution and a domain-transformed reference distribution; and a variance variation estimation unit configured to estimate a variation of a variance of the measured distribution in relation to the reference distribution according to the size difference.

13. The semiconductor memory system of claim 12, wherein the size difference calculation unit is configured to receive the reference distribution or the domain-transformed reference distribution from at least one selected from the group consisting of a part of the memory cell array and an external storage medium.

14. The semiconductor memory system of claim 7, wherein the distribution measurement unit comprises:
a data read unit configured to set a plurality of read levels for measuring the distribution for the plurality of memory cells and perform a read operation on the plurality of memory cells at each of the plurality of read levels; and
a histogram generation unit configured to determine the number of pieces of data '1' or '0' from among pieces of data read at each of the plurality of read levels and generate a histogram showing the number of pieces of data '1' or '0' based on the result of the calculation.

15. The semiconductor memory system of claim 14, wherein the data read unit is configured to set the plurality of read levels so that the plurality of read levels are spaced from one another at equal intervals within a threshold voltage window.

16. The semiconductor memory system of claim 14, wherein the data read unit is configured to set an interval between the plurality of read levels to be relatively small within a region between distributions for directly adjacent states of the plurality of memory cells.

17. The semiconductor memory system of claim 1, wherein the plurality of memory cells comprise NAND flash memory cells.

18. A non-volatile semiconductor memory device comprising:
a memory cell array comprising a plurality of memory cells; and
a control unit configured to perform domain transformation on data written to and/or read from the plurality of memory cells to provide domain-transformed data and configured to perform signal processing on domain-transformed data to output processed data or a control signal.

19. The non-volatile semiconductor memory device of claim 18, wherein the control unit comprises:
a pre-processing unit configured to pre-process the data to provide the processed data in a format suitable for the signal processing;
a domain transformation unit configured to transform pre-processed data from a first domain to a second domain; and
a post-processing unit configured to post-process the transformed data of the second domain to output the processed data or the control signal.

20. The non-volatile semiconductor memory device of claim 18, wherein the control unit comprises a read voltage control unit configured to perform domain transformation on the data read from the plurality of memory cells and estimate a distribution variation for the plurality of memory cells based on the domain transformed data, thereby controlling a voltage level of a read voltage for reading the data.

* * * * *